US009189788B1

(12) United States Patent
Robinson et al.

(10) Patent No.: US 9,189,788 B1
(45) Date of Patent: Nov. 17, 2015

(54) SYSTEM AND METHOD FOR VERIFYING IDENTITY

(75) Inventors: Timothy L. Robinson, Reston, VA (US); Bradford R. Schildt, Boulder, CO (US); Tennille V. Goff, Springfield, VA (US); Daniel J. Corwin, Fredericksburg, VA (US); Timothy Neil Watson, Alexandria, VA (US)

(73) Assignee: Open Invention Network, LLC, Durham, NC (US)

( * ) Notice: Subject to any disclaimer, the term of this patent is extended or adjusted under 35 U.S.C. 154(b) by 973 days.

(21) Appl. No.: 11/304,786

(22) Filed: Dec. 16, 2005

Related U.S. Application Data

(63) Continuation-in-part of application No. 10/464,148, filed on Jun. 18, 2003, now abandoned, which is a continuation-in-part of application No. 10/369,235, filed on Feb. 19, 2003, now abandoned, which is a (Continued)

(51) Int. Cl.
*G06Q 20/00* (2012.01)
*G06Q 20/40* (2012.01)

(52) U.S. Cl.
CPC ................ *G06Q 20/40145* (2013.01)

(58) Field of Classification Search
CPC .................................................. G06Q 20/401
USPC .......................... 705/1, 16, 18, 39, 41, 44, 76
See application file for complete search history.

(56) References Cited

U.S. PATENT DOCUMENTS

| 4,088,890 | A | 5/1978 | Waters |
| 4,230,214 | A | 10/1980 | Cortez |

(Continued)

FOREIGN PATENT DOCUMENTS

| EP | 0598469 A2 | 5/1994 |
| EP | 0762261 A2 | 3/1997 |

(Continued)

OTHER PUBLICATIONS

Davida et al., "On Enabling Secure Applications Through Off-Line Biometric Identification," 1988, *IEEE Symposium on Security and Privacy* p. 0148.

(Continued)

*Primary Examiner* — Charles C Agwumezie
(74) *Attorney, Agent, or Firm* — Haynes and Boone, LLP

(57) ABSTRACT

A system and method of identity verification at a point-of-identification verification (POV) using biometric-based identity recognition and an identity verifying score based upon a presenter's initial identification presentment and their subsequent action in the system. The system also provides tracking and evaluates verifier activity within the system through biometric-based identity recognition and a performance score based upon their actions and the results of their actions within the system. System users register at least one biometric identifier and personal and/or business identity-verifying data. Users present a biometric sample obtained from their person and their system ID number to conduct identification transactions. This data is used to authenticate the user's identity to a percentage of reliability and allows a user with consistently positive ID verifications to establish a higher ID score, strengthening their credibility within the system. Once enrolled, the system allows the user to be identified without presenting any token-based information, such as a driver's license or passport. In one embodiment, an identity verification score generated via the system can be employed in conjunction with online transactions, such as purchases, auctions, email, instant messaging, and the like.

4 Claims, 5 Drawing Sheets

Related U.S. Application Data continuation-in-part of application No. 10/251,305, filed on Sep. 20, 2002, now Pat. No. 7,269,737.

(60) Provisional application No. 60/324,229, filed on Sep. 21, 2001.

(56) References Cited

U.S. PATENT DOCUMENTS

| | | |
|---|---|---|
| 4,359,631 A | 11/1982 | Lockwood et al. |
| 4,553,222 A | 11/1985 | Kurland et al. |
| 4,716,593 A | 12/1987 | Hirai et al. |
| 4,764,015 A | 8/1988 | Bieringer et al. |
| 4,879,747 A | 11/1989 | Leighton et al. |
| 4,915,205 A | 4/1990 | Reid et al. |
| 4,995,081 A | 2/1991 | Leighton et al. |
| 5,032,023 A | 7/1991 | Schneiter |
| 5,042,073 A | 8/1991 | Collot et al. |
| 5,061,062 A | 10/1991 | Schneiter |
| 5,067,162 A | 11/1991 | Driscoll, Jr. et al. |
| 5,082,362 A | 1/1992 | Schneiter |
| 5,086,389 A | 2/1992 | Hassett et al. |
| 5,144,553 A | 9/1992 | Hassett et al. |
| 5,274,695 A | 12/1993 | Green |
| 5,280,527 A | 1/1994 | Gullman et al. |
| 5,289,183 A | 2/1994 | Hassett et al. |
| 5,335,288 A | 8/1994 | Faulkner |
| 5,351,187 A | 9/1994 | Hassett |
| 5,352,876 A | 10/1994 | Watanabe et al. |
| 5,386,104 A | 1/1995 | Sime |
| 5,412,738 A | 5/1995 | Brunelli et al. |
| 5,450,980 A | 9/1995 | Laidlaw |
| 5,453,601 A | 9/1995 | Rosen |
| 5,455,407 A | 10/1995 | Rosen |
| 5,483,601 A | 1/1996 | Faulkner |
| 5,485,510 A | 1/1996 | Colbert |
| 5,523,551 A | 6/1996 | Scott |
| 5,530,514 A | 6/1996 | Lisson et al. |
| 5,546,523 A | 8/1996 | Gatto |
| 5,581,630 A | 12/1996 | Bonneau, Jr. |
| 5,594,806 A | 1/1997 | Colbert |
| 5,598,474 A | 1/1997 | Johnson |
| 5,602,933 A | 2/1997 | Blackwell et al. |
| 5,613,012 A | 3/1997 | Hoffman et al. |
| 5,615,217 A | 3/1997 | Horne et al. |
| 5,615,277 A | 3/1997 | Hoffman |
| 5,657,389 A | 8/1997 | Houvener |
| 5,679,938 A | 10/1997 | Templeton et al. |
| 5,688,974 A | 11/1997 | Devine et al. |
| 5,696,739 A | 12/1997 | Chang |
| 5,719,950 A | 2/1998 | Osten et al. |
| 5,722,526 A | 3/1998 | Sharrard |
| 5,737,439 A | 4/1998 | Lapsley et al. |
| 5,745,598 A | 4/1998 | Shaw et al. |
| 5,751,973 A | 5/1998 | Hassett |
| 5,764,789 A | 6/1998 | Pare, Jr. et al. |
| 5,790,674 A * | 8/1998 | Houvener et al. ............... 713/185 |
| 5,790,785 A | 8/1998 | Klug et al. |
| 5,793,028 A | 8/1998 | Wagener et al. |
| 5,799,092 A | 8/1998 | Kristol et al. |
| 5,802,199 A | 9/1998 | Pare, Jr. et al. |
| 5,805,082 A | 9/1998 | Hassett |
| 5,805,719 A | 9/1998 | Pare, Jr. et al. |
| 5,832,464 A | 11/1998 | Houvener et al. |
| 5,838,812 A | 11/1998 | Pare, Jr. et al. |
| 5,845,256 A | 12/1998 | Pescitelli et al. |
| 5,850,442 A | 12/1998 | Muftic |
| 5,857,079 A | 1/1999 | Claus et al. |
| 5,864,623 A | 1/1999 | Messina et al. |
| 5,870,723 A | 2/1999 | Pare, Jr. et al. |
| 5,872,834 A | 2/1999 | Teitelbaum |
| 5,893,075 A | 4/1999 | Plainfield et al. |
| 5,897,616 A | 4/1999 | Kanevsky et al. |
| 5,910,988 A | 6/1999 | Ballard |
| 5,914,472 A | 6/1999 | Foladare et al. |
| 5,927,544 A | 7/1999 | Kanoh et al. |
| 5,930,804 A | 7/1999 | Yu et al. |
| 5,933,816 A | 8/1999 | Zeanah et al. |
| 5,943,423 A | 8/1999 | Muftic |
| 5,982,914 A | 11/1999 | Lee et al. |
| 5,984,366 A | 11/1999 | Priddy |
| 6,009,411 A | 12/1999 | Kepecs |
| 6,012,039 A | 1/2000 | Hoffman et al. |
| 6,028,950 A | 2/2000 | Merjanian |
| 6,032,137 A | 2/2000 | Ballard |
| 6,040,783 A | 3/2000 | Houvener et al. |
| D425,800 S | 5/2000 | Shin |
| 6,061,660 A | 5/2000 | Eggleston et al. |
| 6,070,141 A * | 5/2000 | Houvener et al. ............... 705/76 |
| 6,070,147 A | 5/2000 | Harms et al. |
| 6,092,192 A | 7/2000 | Kanevsky et al. |
| 6,094,632 A | 7/2000 | Hattori |
| 6,105,010 A | 8/2000 | Musgrave |
| 6,119,932 A | 9/2000 | Maloney et al. |
| 6,148,091 A | 11/2000 | DiMaria |
| 6,149,055 A | 11/2000 | Gatto |
| 6,154,879 A | 11/2000 | Pare, Jr. et al. |
| 6,157,314 A | 12/2000 | Loftus |
| 6,160,903 A | 12/2000 | Hamid et al. |
| 6,161,059 A | 12/2000 | Tedesco et al. |
| 6,161,090 A | 12/2000 | Kanevsky et al. |
| 6,167,517 A | 12/2000 | Gilchrist et al. |
| 6,175,922 B1 | 1/2001 | Wang |
| 6,181,807 B1 | 1/2001 | Setlak et al. |
| 6,192,142 B1 | 2/2001 | Pare, Jr. et al. |
| 6,196,460 B1 | 3/2001 | Shin |
| 6,202,055 B1 | 3/2001 | Houvener et al. |
| 6,222,914 B1 | 4/2001 | McMullin |
| 6,230,148 B1 | 5/2001 | Pare, Jr. et al. |
| 6,233,564 B1 | 5/2001 | Schulze, Jr. |
| 6,246,751 B1 | 6/2001 | Bergl et al. |
| 6,269,348 B1 | 7/2001 | Pare, Jr. et al. |
| 6,282,658 B2 | 8/2001 | French et al. |
| 6,307,955 B1 | 10/2001 | Zank et al. |
| 6,307,956 B1 | 10/2001 | Black |
| 6,310,966 B1 | 10/2001 | Dulude et al. |
| 6,314,169 B1 | 11/2001 | Schelberg, Jr. et al. |
| 6,317,723 B1 | 11/2001 | Walker et al. |
| 6,317,834 B1 | 11/2001 | Gennaro et al. |
| 6,321,339 B1 | 11/2001 | French et al. |
| 6,327,573 B1 | 12/2001 | Walker et al. |
| 6,330,543 B1 | 12/2001 | Kepecs |
| 6,332,134 B1 | 12/2001 | Foster |
| 6,334,109 B1 | 12/2001 | Kanevsky et al. |
| 6,334,112 B1 | 12/2001 | Walker et al. |
| 6,334,113 B1 | 12/2001 | Walker et al. |
| 6,341,169 B1 | 1/2002 | Cadorette, Jr. et al. |
| 6,345,263 B1 | 2/2002 | Matsumoto et al. |
| 6,363,485 B1 | 3/2002 | Adams et al. |
| 6,366,682 B1 | 4/2002 | Hoffman et al. |
| 6,370,649 B1 | 4/2002 | Angelo et al. |
| 6,381,344 B1 | 4/2002 | Smithies et al. |
| 6,389,401 B1 | 5/2002 | Kepecs |
| 6,397,126 B1 | 5/2002 | Nelson |
| 6,397,198 B1 | 5/2002 | Hoffman et al. |
| 6,405,125 B1 | 6/2002 | Ayed |
| 6,415,262 B1 | 7/2002 | Walker et al. |
| 6,422,464 B1 | 7/2002 | Terranova |
| 6,424,249 B1 | 7/2002 | Houvener |
| 6,433,818 B1 | 8/2002 | Steinberg et al. |
| 6,446,044 B1 | 9/2002 | Luth et al. |
| 6,463,127 B1 | 10/2002 | Maier et al. |
| 6,466,917 B1 | 10/2002 | Goyal et al. |
| 6,470,233 B1 | 10/2002 | Johnson, Jr. |
| 6,470,322 B1 | 10/2002 | Walker et al. |
| 6,477,509 B1 | 11/2002 | Hammons et al. |
| 6,496,595 B1 | 12/2002 | Puchek et al. |
| 6,497,360 B1 | 12/2002 | Schulze |
| 6,498,970 B2 | 12/2002 | Colmenarez et al. |
| 6,507,912 B1 | 1/2003 | Matyas et al. |
| 6,522,772 B1 | 2/2003 | Morrison et al. |
| 6,523,741 B1 | 2/2003 | DiMaria et al. |
| 6,529,871 B1 | 3/2003 | Kanevsky et al. |
| 6,529,878 B2 | 3/2003 | De Rafael et al. |
| 6,532,459 B1 | 3/2003 | Berson |

(56) References Cited

U.S. PATENT DOCUMENTS

| | | | |
|---|---|---|---|
| 6,539,282 B2 | 3/2003 | Metcalf et al. | |
| 6,542,874 B1 | 4/2003 | Walker et al. | |
| 6,554,705 B1 | 4/2003 | Cumbers | |
| 6,559,776 B2 | 5/2003 | Katz | |
| 6,567,787 B1 | 5/2003 | Walker et al. | |
| 6,581,042 B2 | 6/2003 | Pare et al. | |
| 6,591,224 B1 | 7/2003 | Sullivan et al. | |
| 6,594,376 B2 | 7/2003 | Hoffman et al. | |
| 6,598,023 B1 | 7/2003 | Drummond et al. | |
| 6,636,973 B1 | 10/2003 | Novoa et al. | |
| 6,646,568 B2 | 11/2003 | MacPhail et al. | |
| 6,647,372 B1 | 11/2003 | Brady et al. | |
| 6,650,999 B1 | 11/2003 | Brust et al. | |
| 6,651,063 B1 | 11/2003 | Vorobiev | |
| 6,653,946 B1 | 11/2003 | Hassett | |
| 6,655,585 B2 | 12/2003 | Shinn | |
| 6,662,166 B2 | 12/2003 | Pare et al. | |
| 6,685,088 B1 | 2/2004 | Royer et al. | |
| 6,694,300 B1 | 2/2004 | Walker et al. | |
| 6,695,206 B2 | 2/2004 | Ross | |
| 6,715,673 B2 | 4/2004 | Fulcher et al. | |
| 6,715,674 B2 | 4/2004 | Schneider et al. | |
| 6,735,695 B1* | 5/2004 | Gopalakrishnan et al. | 713/186 |
| 6,745,327 B1 | 6/2004 | Messing | |
| 6,748,365 B1 | 6/2004 | Quinlan et al. | |
| 6,755,344 B1 | 6/2004 | Mollett et al. | |
| 6,792,334 B2 | 9/2004 | Metcalf et al. | |
| 6,792,422 B1 | 9/2004 | Stride et al. | |
| 6,796,492 B1 | 9/2004 | Gatto | |
| 6,796,499 B1 | 9/2004 | Wang | |
| 6,827,260 B2 | 12/2004 | Stoutenburg et al. | |
| 6,839,690 B1* | 1/2005 | Foth et al. | 705/53 |
| 6,847,935 B1 | 1/2005 | Solomon et al. | |
| 6,854,642 B2 | 2/2005 | Metcalf et al. | |
| 6,865,544 B1 | 3/2005 | Austin | |
| 6,871,287 B1 | 3/2005 | Ellingson | |
| 6,873,969 B2 | 3/2005 | Stone et al. | |
| 6,886,742 B2 | 5/2005 | Stoutenburg et al. | |
| 6,892,178 B1 | 5/2005 | Zacharia | |
| 6,892,302 B2 | 5/2005 | Wheeler et al. | |
| 6,895,385 B1 | 5/2005 | Zacharia et al. | |
| 6,928,546 B1 | 8/2005 | Nanavati et al. | |
| 6,935,559 B2 | 8/2005 | Mollett et al. | |
| 6,938,160 B2 | 8/2005 | Oono | |
| 6,959,381 B2 | 10/2005 | Wheeler et al. | |
| 7,006,983 B1 | 2/2006 | Packes, Jr. et al. | |
| 7,725,732 B1* | 5/2010 | Ballard | 713/186 |
| 2001/0000535 A1 | 4/2001 | Lapsley et al. | |
| 2001/0011680 A1 | 8/2001 | Soltesz et al. | |
| 2001/0025245 A1 | 9/2001 | Flickinger et al. | |
| 2001/0034609 A1 | 10/2001 | Dovolis | |
| 2001/0042022 A1 | 11/2001 | Kirkpatrick et al. | |
| 2001/0047223 A1 | 11/2001 | Metcalf et al. | |
| 2001/0047343 A1 | 11/2001 | Dahan et al. | |
| 2001/0051924 A1* | 12/2001 | Uberti | 705/44 |
| 2002/0019811 A1 | 2/2002 | Lapsley et al. | |
| 2002/0029196 A1 | 3/2002 | Metcalf et al. | |
| 2002/0038165 A1 | 3/2002 | McHale, IV et al. | |
| 2002/0046121 A1 | 4/2002 | Walker et al. | |
| 2002/0062249 A1 | 5/2002 | Iannacci | |
| 2002/0065763 A1 | 5/2002 | Taylor et al. | |
| 2002/0077889 A1 | 6/2002 | Kolls | |
| 2002/0077890 A1 | 6/2002 | LaPointe et al. | |
| 2002/0077902 A1 | 6/2002 | Marcus | |
| 2002/0087413 A1 | 7/2002 | Mahaffy et al. | |
| 2002/0091537 A1 | 7/2002 | Algazi | |
| 2002/0094111 A1 | 7/2002 | Puchek et al. | |
| 2002/0111917 A1 | 8/2002 | Hoffman et al. | |
| 2002/0112177 A1 | 8/2002 | Voltmer et al. | |
| 2002/0116266 A1 | 8/2002 | Marshall | |
| 2002/0128851 A1 | 9/2002 | Chefalas et al. | |
| 2002/0148892 A1 | 10/2002 | Bardwell | |
| 2002/0153414 A1 | 10/2002 | Stoutenburg et al. | |
| 2002/0161629 A1 | 10/2002 | Jentoft | |
| 2002/0162031 A1 | 10/2002 | Levin et al. | |
| 2002/0173986 A1 | 11/2002 | Lehew et al. | |
| 2002/0178063 A1 | 11/2002 | Gravelle et al. | |
| 2002/0190125 A1 | 12/2002 | Stockhammer | |
| 2002/0194122 A1 | 12/2002 | Knox et al. | |
| 2002/0194128 A1 | 12/2002 | Maritzen et al. | |
| 2002/0196963 A1 | 12/2002 | Bardwell | |
| 2003/0006277 A1 | 1/2003 | Maskatiya et al. | |
| 2003/0009382 A1 | 1/2003 | D'Arbeloff et al. | |
| 2003/0009393 A1 | 1/2003 | Norris | |
| 2003/0018522 A1 | 1/2003 | Denimarck et al. | |
| 2003/0018567 A1 | 1/2003 | Flitcroft et al. | |
| 2003/0034876 A1 | 2/2003 | Puchek et al. | |
| 2003/0046228 A1 | 3/2003 | Berney | |
| 2003/0055727 A1 | 3/2003 | Walker et al. | |
| 2003/0067396 A1 | 4/2003 | Hassett | |
| 2003/0075287 A1 | 4/2003 | Weik | |
| 2003/0076417 A1 | 4/2003 | Thomas et al. | |
| 2003/0090473 A1 | 5/2003 | Joshi | |
| 2003/0105725 A1 | 6/2003 | Hoffman | |
| 2003/0132840 A1 | 7/2003 | Bahar | |
| 2003/0144956 A1 | 7/2003 | Yu et al. | |
| 2003/0150907 A1 | 8/2003 | Metcalf et al. | |
| 2003/0171985 A1 | 9/2003 | Prabhu et al. | |
| 2003/0182421 A1* | 9/2003 | Faybishenko et al. | 709/224 |
| 2003/0183689 A1 | 10/2003 | Swift et al. | |
| 2003/0187790 A1 | 10/2003 | Swift et al. | |
| 2003/0187796 A1 | 10/2003 | Swift et al. | |
| 2003/0191709 A1 | 10/2003 | Elston et al. | |
| 2003/0209599 A1 | 11/2003 | Gatto | |
| 2003/0216967 A1 | 11/2003 | Williams | |
| 2003/0216987 A1 | 11/2003 | Mollett et al. | |
| 2003/0222135 A1 | 12/2003 | Stoutenburg et al. | |
| 2003/0229539 A1 | 12/2003 | Algiene | |
| 2003/0229540 A1 | 12/2003 | Algiene | |
| 2003/0229790 A1 | 12/2003 | Russell | |
| 2003/0236704 A1 | 12/2003 | Antonucci | |
| 2004/0012481 A1 | 1/2004 | Brusseaux | |
| 2004/0020982 A1 | 2/2004 | Hoffman et al. | |
| 2004/0024672 A1 | 2/2004 | Brack et al. | |
| 2004/0039632 A1 | 2/2004 | Han et al. | |
| 2004/0054587 A1 | 3/2004 | Dev et al. | |
| 2004/0083172 A1 | 4/2004 | Wiederin | |
| 2004/0088232 A1 | 5/2004 | Minnis, Jr. | |
| 2004/0088295 A1 | 5/2004 | Glazer et al. | |
| 2004/0143505 A1 | 7/2004 | Kovach | |
| 2004/0155101 A1 | 8/2004 | Royer et al. | |
| 2004/0158524 A1 | 8/2004 | Anderson et al. | |
| 2004/0192434 A1 | 9/2004 | Walker et al. | |
| 2004/0201520 A1 | 10/2004 | Flick | |
| 2004/0215565 A1 | 10/2004 | Huffman | |
| 2004/0254840 A1 | 12/2004 | Slemmer et al. | |
| 2005/0010478 A1 | 1/2005 | Gravelle | |
| 2005/0055582 A1 | 3/2005 | Bazakos et al. | |
| 2005/0125339 A1* | 6/2005 | Tidwell et al. | 705/39 |
| 2005/0132202 A1* | 6/2005 | Dillaway et al. | 713/179 |
| 2005/0144133 A1 | 6/2005 | Hoffman et al. | |
| 2005/0165700 A1 | 7/2005 | Karthik | |
| 2005/0251688 A1 | 11/2005 | Nanavati et al. | |
| 2006/0106734 A1* | 5/2006 | Hoffman et al. | 705/64 |
| 2007/0143860 A1* | 6/2007 | Hardt | 726/28 |
| 2007/0218900 A1* | 9/2007 | Abhyanker | 455/435.1 |
| 2009/0001170 A1 | 1/2009 | He | |
| 2010/0106800 A1* | 1/2010 | Rockrohr | 604/167.06 |
| 2010/0318460 A1* | 12/2010 | Stewart et al. | 705/40 |
| 2012/0016800 A1* | 1/2012 | Stewart et al. | 705/44 |

FOREIGN PATENT DOCUMENTS

| | | |
|---|---|---|
| JP | 358044583 A | 3/1983 |
| WO | WO 99/47989 A1 | 9/1999 |
| WO | WO 01/20525 A1 | 3/2001 |
| WO | WO 01/61601 A1 | 8/2001 |
| WO | WO 01/65338 B1 | 3/2002 |

OTHER PUBLICATIONS

ABSA. Purchasing Credit Card. http://www.absa.co.za/Corporate/0,2999,2210,00.html.

(56) References Cited

OTHER PUBLICATIONS

Accounting 5544. Biometric Technology. http://acctserver.cob.vt.edu/faculty.jhicks/acct5544/present/ddeverea.htm. Apr. 1997.
Arizona State University. The Purchasing Card: A Guide for Users. http://www.asu.edu/purchasing/pdf/purchcard.pdf. Jan. 2005.
Biometric Digest. Mar. 1998.
Biometric Technology Today (BTT). vol. 6(5) Sep. 1998.
Biometrics in Human Services. vol. 2(1) Feb. 1998.
City of Aspen. Parking. http://www.aspenpitkin.com/depts/61/payanddisplay.cfm.
Comparison of Biometric Identification Methods. http://www.and.nl/id/gen_biom.html. Dec. 1998.
Electronic Banking 1. http://www.sjb.co.uk/ebl.html. Aug. 1998.
Gerald Lazar. Agencies Scan Biometrics for Potential Applications. FCW.com (http://www.fcw.com.pubs.few.1997/0120/feature.htm) Jan. 1997.
IBM Technical Disclosure Bulletin, Title: selective receipt of document elements in an electronic mail system, Issue No. 429, TDB-ACC-No. NNRD429177, Jan. 2000, UK.
James P. Holmes et al. A Performance Evaluation of Biometric Identification Devices. Sandia Report. Jun. 1991.
John Daugman. The Scientific Basis for Iris Recognition. Http://www.iriscan.com/basis.htm. Dec. 1998.
Lawrence Aragon. Show me some ID. PC Week Online (http://www.zdnet.com/pcweek/0112/12bio.html) Jan. 1998.
Morpho Touch—Multi-Application Finger Identification in the Palm of Your Hand, Sagem Porpho, Inc., 1999.
New Technology Enables Computers to Identify, Verify User Voices. http://www.srapi.com/savpi/pr041597.html. Apr. 1997.
Office of NYS Attorney General Eliot Spitzer. Financial Giant Joins Fight Against Online Gambling. Press Release. http://www.zionsbank.com/bank_cards.jsp?leftNav=bf_bfinance&topNav=bfinance. Jun. 2002.
Reference Guides Glossary Terms (Online Glossary Terms and Definitions). Merchant Glossary: Merchant Category Code (MCC) (Merchant Category Code) (MCC) Help). http://glossary.reference-guides.com/Merchant/Merchant_Category_Code_MCC/. 2003.
S. Davies. Touching Big Brother. How Biometric Technology Will Fuse Flesh and Machine. Information Technology & People. vol. 7 (4) 1994.
SmartCity. SmartCity Card Solutions. http://www.coinamatic.com/coinamatic_group/html/apartment_laundry_services/smartcity/Products/p4.html.
The Biometric Bar Tab Project. http://www.csee.wvu.edu/~wise/biometric/index.htm.
The Speech Recognition API (SRAPI) Committee Announces Support for Speaker Verification. http://www.srapi.com/svapipr.html. Oct. 1996.
TMCnet. Cemium Installs Perceptrak Behavrior Recognition Software in Public Parking Garage in Yonkers. http://www.tmcnet.com/usubmit/2003/Dec/1021669.htm. Dec. 2003.
TranCore. TransCore Access Control System First to Successfully Combine Biometrics and RFID. http://www.transcore.com/news/news050314.htm. Mar. 2005.
University of Denver. Purchasing Card User Guide. http://www.du.edu/purchasing/purcard.htm#2.%20HOW%20DOES%20THE%20CARD%20WORK?.
University of Wisconsin-Green Bay. Purchasing Department: Purchasing Card. http://www.uwgb.edu/Purchasing/purchasingCard/procurement07.htm.
Vault FAQs. http://www.ImagineNation.com/Xanadu/Vault. Jun. 1997.
Video Insight. http://www.video-insight.com/dvr221.htm.
Visa U.S.A. Visa Purchasing. http://www.usa.visa.com/corporate/corporate_solutions/payment/visa_purchasing.html?it=c|/corporate/corporate_solutions/index%2Ehtml|Visa%20Purchasing%20.
Washington Post—For Dining in, Security Is the Order of the Day; Post 9/11 Concerns Thwarting Deliverymen: [Final Edition], 2004.
Williams College Controller's Office. Purchasing Card Procedures. http://www.williams.edu/admin/controller/pcard.html#whatis. Jan. 2005.
Zions Bank. Cards for Any Business Occasion. http://www.zionsbank.com/bank_cards.jsp?leftNav=bf_bfinance&topNav=bfinance.

\* cited by examiner

SYSTEM AND METHOD FOR VERIFYING IDENTITY

CROSS REFERENCE TO RELATED APPLICATIONS

This application is a continuation-in-part of application Ser. No. 10/464,148, filed Jun. 18, 2003 now abandoned, which is a continuation-in-part of application Ser. No. 10/369,235, filed Feb. 19, 2003 now abandoned, which is a continuation-in-part of application Ser. No. 10/251,305, filed Sep. 20, 2002 now U.S. Pat. No. 7,269,737, which claims priority from provisional application No. 60/324,229, filed Sep. 21, 2001. Each of the above-identified applications is incorporated by reference herein, in their entireties, for all purposes.

INTRODUCTION

This application relates generally to the field of identity verification. More particularly, the present invention relates to a tokenless system and method for verifying and scoring an individual's identity via biometric authentication.

BACKGROUND OF THE INVENTION

Identity fraud, a growing national problem, occurs whenever an individual uses stolen or fabricated identity information to obtain goods or services that they would not normally have privilege to access. From identity theft to identity misrepresentation, identity fraud is not only a problem to identity presenters and identity verifiers because it costs them time and money, but it is an additional problem to identity presenters because it inhibits or removes their ability to positively identify himself or herself, which is central to everyday activities. Once the ability to identify oneself positively is complicated or stolen, day-to-day activities are hindered at the least, if not halted.

In the current system of identity verification, individuals present tokens to identify themselves. For example, registering for services or accessing restricted areas or products typically requires presentation of some type of identification token. To purchase cigarettes an individual must present a form of identity that verifies they are of age to purchase them. This identification is usually some type of driver's license or identity card. Additionally, to pay for something via most forms of payment (e.g. credit, debit, or checking), one has to verify their identity as an account holder on the presented account. This is usually achieved by their presenting some type of token that represents the account. This token provides proof that the person presenting the token is privileged to access the account. In many instances, the token presenter may be required to present other information to access the account, such as a signature, PIN, out-of-wallet information, or identification document. However, such additional information is not necessarily a reliable identification double check because signature comparisons cannot be accurately compared by the human eye, a PIN can be stolen, out-of-wallet information takes too long to obtain and confirm for a common ID transaction, and identification documents in addition to the one presented are an inconvenience to carry.

There are two main deficiencies in the current methods of identity verification that contribute to the high level of identity fraud that exists: 1) identity verification and identity verification linked activities are too intricately tied to tokens that, in actuality, have little tie to the individual being identified and can easily be fabricated, lost, or stolen; and 2) identity verification is typically not based upon a traceable personal history of actions.

A significant problem with current identity verification methods is that they rely too heavily on the identification token. The token is problematic because its only tie to its owner is the information presented on it. Additionally, the only way that information is linked to the owner is through the verifiability that the document was generated by a reputable agency (typically the government) and knowledge that the owner presents. In essence, as long as the token looks as if it were issued by a reputable agency and as long as the presenter looks relatively similar to the individual pictured on the token and the token presenter has memorized the information printed or encoded on the token, the token presenter is recognized as the rightful token presenter. This identification could, in fact, be inaccurate, but because the token looks authentic and because an individual has verified that the token presenter looks similar to the individual on the token and knows the information displayed on the token, the individual has also verified the presenter. This is also a misconception of financial tokens: as long as the presenter can verbally or physically verify the information on the token or present an additional token to support the information on the initial token, the presenter's identity is approved.

Previously suggested solutions to this problem include systems wherein a computer chip is implanted in the token, such as a smart chip, that stores individual-specific information such as a biometric or PIN that is not printed on the card. The problem with such systems is that although they provide an alternative to one of the identification system's largest problems, the token, they do not provide any type of identity verification tracking that might help solve another of the problems with the current identity verifying system.

A second significant problem with current identity verification methods is that each occurrence of identity verification is usually cut off from all others. For example, there is no way of knowing whether or not an individual's identity has been verified at another location, whether that individual is using an identity token for the first time, or whether that individual has just been declined identity verification at another location. Therefore, the identity verifier has no frame of reference regarding how often and to what degree of certainty an individual's identity has been verified.

What would be quite useful is a biometrically activated system and method that scores the verifiability that a person is who they claim to be both at an initial point of identification and at subsequent points of identification within the system. Biometric access of such a score would eliminate the inherent problems of the token, the human error often found with human recognition and verification, and would tie the identity verification process directly to the individual being identified, since biometrics—such as, but not limited to, fingerprints, retinal patterns, face ratios—are features of an individual that are biologically tied to them and which are difficult to change, lose, impersonate, or steal. It would also be useful to have a system that would provide identity verifiers with a score based upon the person's history of actions within the system which help indicate the likelihood that the person seeking identity verification is the rightful owner of the presented identity. It would also be useful to have a system that would give subsequent ID verifiers an indication of the quality of the initial identification of the presenter and help subsequent verifiers decide whether or not to trust the presenter at a glance. Not only would such a system and method increase the convenience and speed of identifications for both the presenter and the verifier, but in accessing an identification record through biometric authentication, the verifier would be further assured that the presenter's presented identity is valid, since biometrics are unique characteristics of each individual. Linking biometrics with the identity scoring process would be a more complete, secure, and convenient process of identity verification for all honest parties involved.

SUMMARY OF THE INVENTION

It is therefore an aspect of the current invention to provide a system and method to help facilitate an identity verification system, wherein biometric identity verification and identity scoring are used to verify an individual's identity.

Another aspect of the current invention is to provide a system that provides identity verifiers with a score based upon the presenting person's history of actions within the identity verification system, which helps indicate the likelihood that the person seeking identity verification is the rightful owner of the presented identity.

Still another aspect of the current invention is to provide a system that gives subsequent identity verifiers an indication of the quality of the initial identification of the presenter and helps subsequent verifiers decide whether or not to trust the presenter at a glance.

It is also an aspect of the current invention to provide a system and method that increases the security of identity verifications and aids their speed and convenience.

It is another aspect of the current invention to provide a system and method that deters criminals from identity fraud.

It is also an aspect of the current invention to provide presenters and verifiers with an ID verification score based on their use of the system, so that veteran system users who maintain a high ID verification score are consistently positively identified.

A system implementing the present invention uses at least one database that stores information concerning a plurality of identity verifiers (i.e., individuals or automated systems that verify identity) and a plurality of identity presenters (i.e., individuals seeking identity verification). The system uses at least one point of identification verification terminal (POV) that has connections to peripherals for biometric scanning and has communication lines for connection to the database where presenter and verifier information is stored.

To register in the system, an individual presents at least one biometric sample and identity-verifying information. The biometric sample may be, for example and without limitation, a fingerprint, a retinal scan, an iris scan, a face geometric scan, a voice scan, a hand architecture scan, a vein structure scan, a signature sample, a DNA sample, or any other physical measurement pertaining to one's person. The identity-verifying information may be, for example and without limitation, a name, a home address, a telephone number, or a government ID number and state of issue. The individual's record is scored according to how much information is presented during registration (e.g., solely presenting a driver's license versus presenting a driver's license, a military ID and a social security card), what type of information is presented during registration (i.e., government ID versus private institution ID), how the information is presented during registration (hand-keyed versus electronically scanned), and whether or not the information is legitimately verified in a third party database (such as a state driver's license database). For example, an individual who presents three different forms of identification (i.e., a driver's license, a military ID and a social security card) will be assessed a higher score than an individual who presents only one form (i.e., a driver's license) of identification. The method used to enter an individual's personal information also affects their identity score. For example, an individual whose personal information is entered into the system via direct means such as scanning will be assessed a higher identity score than an individual whose personal information is entered by the verifier hand-keying the information into the system. Additionally, a higher score is assessed to individuals whose personal information is verified by a third party database. For example, an individual whose personal information is verified by a credit institution is assessed a higher identity score than an individual whose information is not on record with that third party database.

In an additional embodiment, the individual also registers with the system a system identification number (SID) that is used in conjunction with their biometric scan for identification verification. Although an SID is typically described in terms of a number, this should not be construed as limiting, as an SID can be any combination of alphanumeric characters, such as a phone number, name, or the like.

An individual who has already registered in the system may verify their identity at any participating POV by entering the individual's biometric sample. The individual may optionally enter a SID. This information is sent to the central database where is it used to find the individual's identity-verifying record. Once the identity-verifying record is found, the individual's identity score is examined to determine whether or not it is at or above the level pre-set for identity verification acceptance. If the individual's score is at or above the pre-set level, the individual's identity is verified.

It is also an object of the present invention to create a system that allows an individual to present identification documents once upon enrollment and then to use a biometric scan or a biometric scan and a SID to verify their identity at other locations using the system.

A presenter builds identification trust by positively identifying themselves within the system frequently. Each positive identification, whether the positive identification occurs through an identification transaction or through another means such as account access, strengthens a presenter's ID verification score, and in turn, creates a tangible record of their past ID verifications within the system, helping to form an immediate and trusting relationship with future verifiers in the system.

These and other aspects of the present invention will become apparent to those skilled in the art by a review of the specification that follows. Although a number of salient features of the present invention have been described above, the detailed description that follows provides a more detailed exposition of additional features of the invention as it is embodied in various forms.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purposes of description and should not be regarded as limiting.

BRIEF SUMMARY OF THE DRAWINGS

Additional objects and advantages of the present invention will be apparent in the following detailed description read in conjunction with the accompanying drawing figures.

DETAILED DESCRIPTION OF THE INVENTION

As previously noted, the present invention encompasses a system and method for verifying an individual's identity using a biometric sample and an identity verification score, which is a numerical compilation of various factors such as but not limited to the identification presented at enrollment, the manner in which identification is entered into the system at enrollment (hand-keyed, card-swiped, scanned), and the frequency and success of an enrolled individual's use of the system. As used in this description, the term "card-swiped" refers to the reading of information recorded magnetically on a strip of magnetic recording medium. The term "scanned," as used in this description, refers to both optical scanning (for image capture or character recognition) and the scanning of information recorded via magnetic ink.

Figure 1:
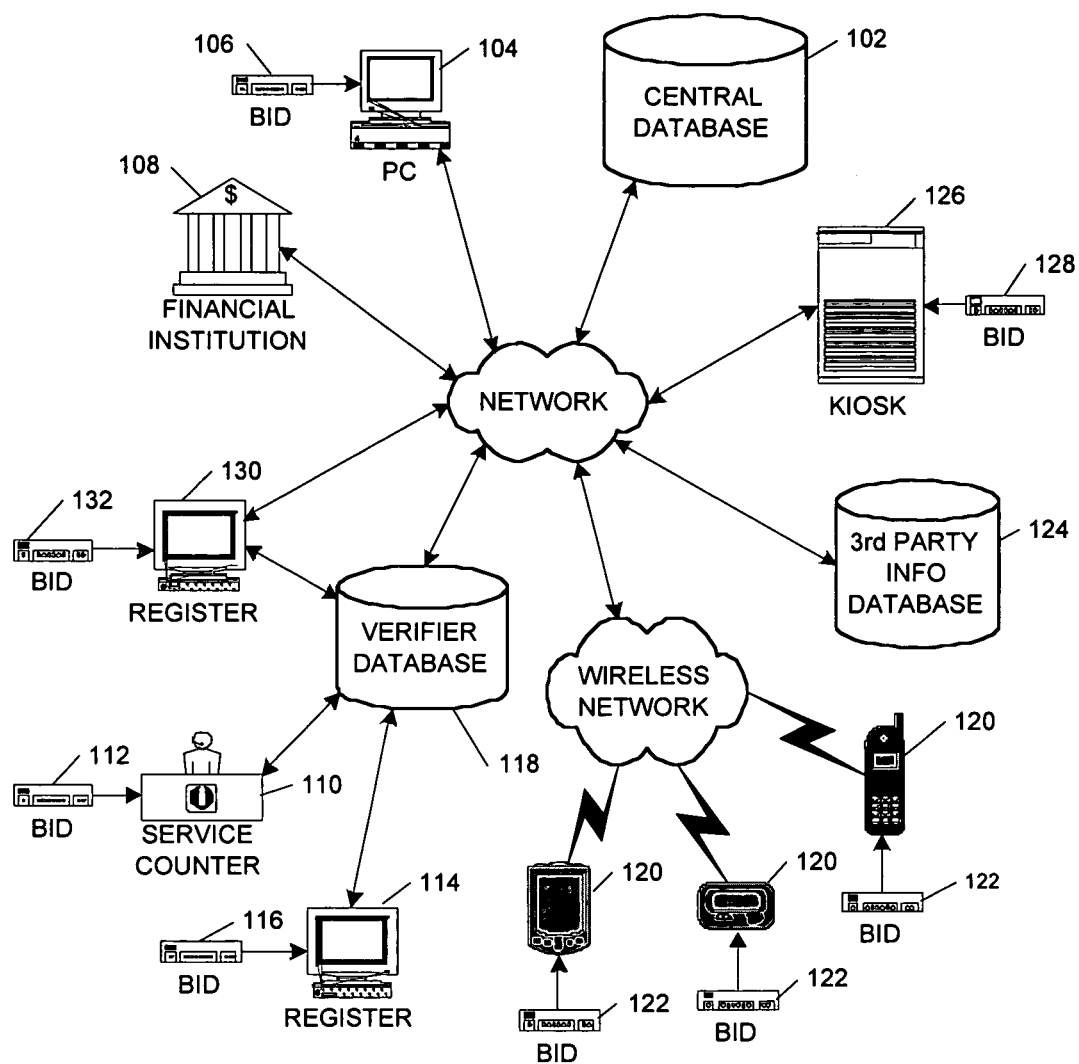
FIG. 1 illustrates a general architecture overview of a system for identity verification according to an embodiment of the present invention.

Referring to FIG. 1, a general architecture overview of a system for identity verification using biometric matching and identity scoring is illustrated. The system includes a central database 102, wherein identity verification records are stored, as well as information about authorized points of verification (POVs). The identity verification records contain information related to individuals seeking identity verification (that is, presenters). Various other records and databases may also be held in the system's central database. In an additional embodiment, the central database 102 further comprises one or more databases that store various system data. In such an embodiment, ID presenter data, verifier data, and other system data may be distributed across multiple databases within the central database. Alternatively (or redundantly), the verifier database 118 holds information related to presenters and authorized POVs.

Each identity verifying record holds presenter identity verifying information, such as a presenter's government identification number(s) and corresponding state(s) of issue, home address, and a telephone number; at least one biometric sample; and an identity verifying score. The presenter identity verifying score is a numerical evaluation of the presenter's history within the system. A presenter may present any number of identity verifying documents or testaments to their identity. By way of illustration and not of limitation, examples of such documents or testaments include a financial token, a digital image, a video clip, family information, DNA sample, or family verification. Identity scores are shared across a plurality of registered verifiers, allowing presenters to verify their identity at any verifier enrolled in the system. In an additional embodiment the identity verifying records also hold at least one system identification number (SID) for the presenter. A presenter may choose a SID from any of the previously listed numbers, may select their own SID number, or may choose from among system suggested ID numbers. It is preferred that the SID be a unique number, or at least a reasonable unique number. However, the present invention may also be workably practiced using a non-unique number for the SID.

Each identity verifier record holds information useful for authenticating an identity verifier, such as a verifier name or ID number, an address, and a phone number. In an alternate embodiment of the present invention, the identity verifier records also hold merchant information if the verifier is a merchant or an employee of a merchant. In another embodiment of the present invention, verifier records hold a verifier's SID, a verifier biometric scan, and a verifier identity score. In additional embodiments, the verifier records also hold one or more of the following: verifier operation parameters, which limit the verifier's activity in the system to set functions; a verifier performance score, wherein the verifier's actions within the system and/or their employment level (e.g. manager versus clerk) is numerically evaluated; or verifier pre-set parameters, which may be used to help determine presenter identity verification within the system. In an embodiment wherein performance scores of verifiers are recorded and tracked within the system, these scores may also be considered in determining the identity scores of those presenters the verifier has verified.

The system may be configured so that the central database 102 is connected to a network, such as, but not limited to, the Internet. This network comprises connections to at least one POV station, such as but not limited to a transaction register 114 or 130 with connected or integrated BID 116 or 132; a service counter 110 with connected or integrated BID 112; a computer 104; a wireless device 120 (e.g., a cell phone, personal data assistant, or pager); a kiosk 126; and a verifier database 118 having one or more connected identity verification stations (e.g., a transaction register or service counter with connected or integrated BID). In an additional embodiment, the verifier database 118 stores various system records and communicates enrollment and transaction information to the central database 102.

According to an alternate embodiment, the system also includes connections to one or more financial institution 108 and one or more third party information database 124. Such connections enable presenters to perform financial transactions with their identity verifying records. Structure and processes for effecting such financial transactions are disclosed in detail in co-pending utility application Ser. No. 10/251, 305, filed on Sep. 20, 2002, which is incorporated herein by reference. By way of illustration and not as a limitation, the type of information held in the third party database(s) includes government, financial, public, and private information. Examples of third party databases that are useful for implementing this alternate embodiment are TransUnion, Experian, and Equifax.

Presenter or verifier enrollment into a system according to the present invention may be conducted through a registered verifier's local system. A local system is defined here as a verifier's system of connected information processors, including but not limited to the verifier local database(s) 118 and transaction processing device(s), 110, 114, 130. A system kiosk 126 might also be considered part of said local system if it is so configured and integrated into the local system.

Presenters interested in enrolling in the invention's system further have the option to pre-enroll, that is provide a partial enrollment, by providing only a portion of the required enrollment information, for the invention's services via a computer 104, a kiosk 126, a verifier device 110, 114, 130; or a wireless device 120. Pre-enrollment records are stored as partial records which cannot be used until the remainder of enrollment information is collected. Such partial records are marked as having pre-enrollment status. Pre-enrollment records are stored in the central database 102 but may be accessed by any participating verifier for enrollment completion.

According to one embodiment, pre-enrollment records are stored only in a verifier database 118. Such an embodiment asks presenters to choose a verifier to send their pre-enrollment information to. According to an alternative embodiment, a pre-enrollment record may be stored in both the central database 102 and a verifier database 118.

Other forms of pre-enrollment may include registering with the identity verification system's central database various presenters' information that is drawn from database information that has been purchased or otherwise acquired. By way of illustration and not as a limitation, the central database operator purchases driver's license data from a state or government database and uses that information during presenter pre-enrollment, wherein the information is checked when the presenter pre-enrolls, is checked during enrollment finalization wherein the presenter is seeking to complete their enrollment into the system, or is checked during a complete enrollment. This information is easily entered into the central database so that when a presenter whose information was recorded in one of those databases wants to pre-enroll or enroll in the system of the invention, some or all of that information contained within a purchased or acquired database is already available within the system. The already stored information would not need to be entered at the time of enrollment, thus saving time for the presenter during enrollment.

Identity verifications are conducted within the system through a number of devices including but not limited to a presenter transaction device 110, 114, 130 with attached BID 112, 116, 132. In another embodiment, the system is configured to conduct identity verifications through remote devices, such as a PC 104, a wireless device 120, or a kiosk 126. For the purpose of this application, a remote device is defined as any device connected to a network through which the device may communicate with the system's central database and which is not directly connected to a registered verifier's database. These remote devices and all other remote devices which communicate with the system's central database may contain BID capabilities or be connected to a peripheral with BID capabilities. Although the kiosk 126 with BID 128 is listed above as a remote device, it is envisioned that the kiosk 126 optionally resides in the verifier location for enrollments, pre-enrollments, identity verifications, record maintenance, and in an additional embodiment, purchases. The kiosk 126 may be configured as a remote device or a local device depending on whether or not the registered verifier desires to integrate the kiosk into its local system.

Presenters are free to manage their system records through a record management function that allows individuals to update personal information registered in their system record. These changes may be conducted at any of the following: a computer 104 with a BID 106; a wireless device 120 with BID 122; any participating verifier's transaction device 110, 114, 130 with a BID 112, 116, 132; or a kiosk 126 with a BID 128.

Figure 2:
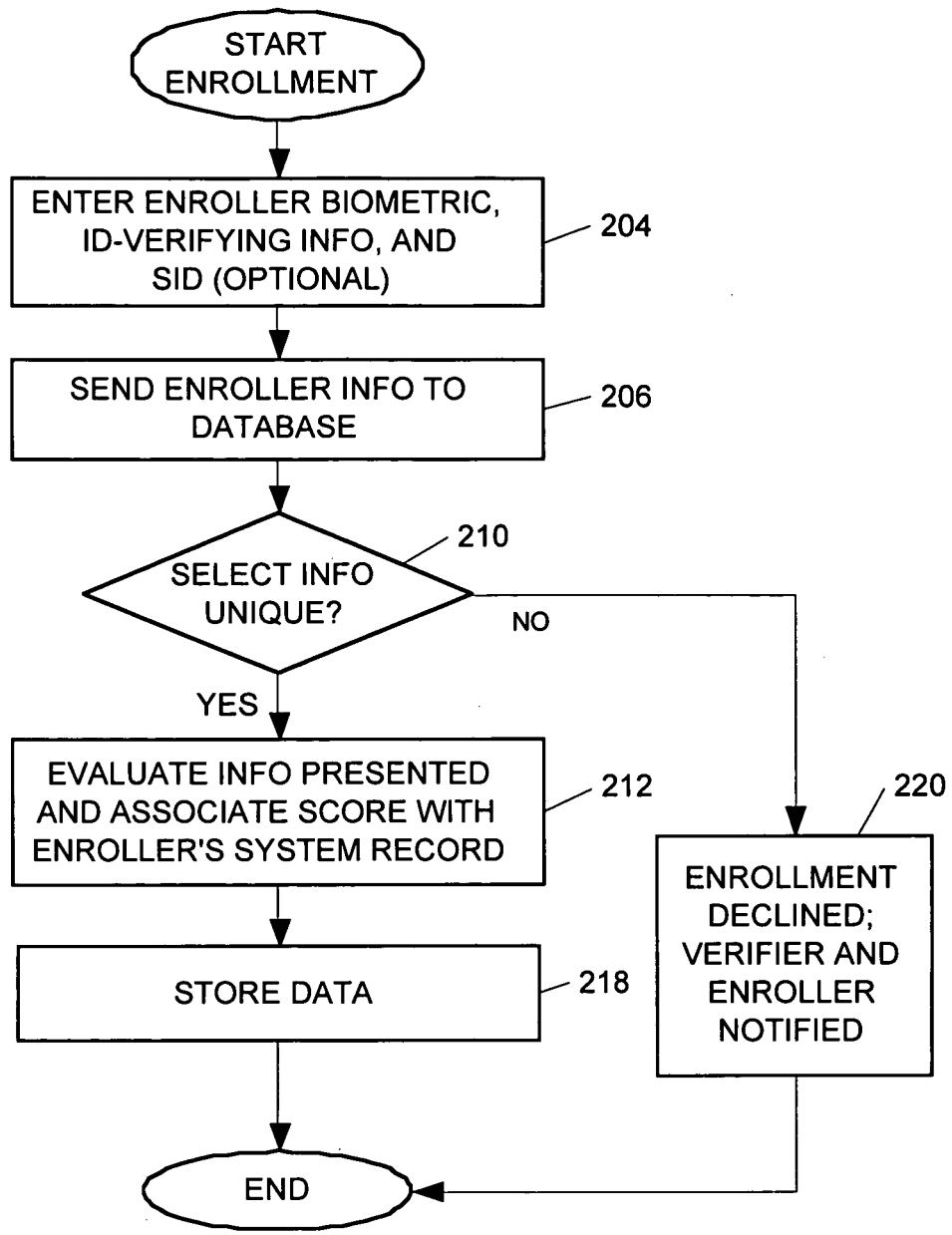
FIG. 2 illustrates a flowchart of a process for enrollment into an identity verification system according to an embodiment of the present invention.

Referring to FIG. 2, a flowchart of an enrollment process according to an embodiment of the present invention is illustrated. Any identity verification within the system wherein a presenter presents identity verifying information other than their biometric is referred to as a primary identity verification. An individual's enrollment into the system is referred to as an initial, primary ID verification, and all additional verifications in which an individual produces additional ID information to supplement their system ID record are referred to as a primary identity verifications. ID verifications wherein individuals present only their biometric or their biometric and SID for ID verification are referred to as secondary verifications from hereon. The following enrollment process is discussed in terms of verifier and presenter; however, it should be understood that the enrollment also comprises a verifier enrolling another verifier. In an alternate embodiment, the verifier is automated.

Information collected during an initial, primary ID verification varies depending on the embodiment of the system. However, it is conceived that the more information provided, the more reliable the presenter's ID verification score will be. By way of illustration and not as limitation, one embodiment of the system figures six factors during an initial primary ID verification.

The first factor is how presenter identity information is presented. For example, identity information that is hand-keyed yields a lower score than information that is MAG stripe read or bar code scanned, since information is machine read and can be directly pulled from a MAG stripe read or bar code scan. If the information is hand-keyed, that information is less reliable than the machine read information because hand-keying information introduces the potential for human error. Therefore, if suitable identity-verifying information such as a government ID number and state of issue, a social security number, address, phone number, digital scans of information documents presented for identification, and/or other information about the enrolling presenter is presented in a form which can be machine read, the presenter's initial primary ID verification score is higher. Optionally, identity documents such as a driver's license or identification card are digitally imaged and stored in the respective presenter's identity verifying record. Digitally imaging identity documents allows a presenter to raise their identity verification score because these digital scans provide a system embodied according to the present invention a security feature that enables verifiers to view digital images of the identity documents presented for initial identity verification. Such a feature also enables authorized individuals (such as verifiers and law enforcement officials) who challenge an identity verification to view the identifying documents the presenter presented upon enrollment into the system.

The second factor is the type of identification document(s) a presenter presents during an initial, primary ID verification. For example, a government-issued identity document yields a higher score than a privately-issued document since the ID issued by a government agency is more regulated and most likely more trusted than a private agency.

The third factor is the verifiability of the information a presenter presents. For example, if a presenter presents information that may be double checked against a $3^{rd}$ party database, that information yields a higher score than personal knowledge information that cannot be verified by any source other than the person presenting the information. Additionally, asking the presenter personal knowledge questions (also known as "out-of-wallet" questions) obtained from one or more third party databases allows the system to evaluate the presenter's credit history, which may also affect the presenter's ID verification score.

The fourth factor is the method of ID verification. For example, a presenter conducting an initial, primary ID verification at an attended enrollment station yields a higher score than a presenter conducting an initial, primary ID verification at an unattended kiosk since an attended enrollment is more secure than an unattended enrollment. As another example, identity information received via an enrollment website could be determined to be less reliable than information received from at a service counter with the presence of an enrollment clerk. Similarly, information provided via authorized or preferred equipment could yield a higher score than information received via other equipment. For example, fingerprint data acquired at a kiosk distributed by an authorized service provider could yield a higher score than fingerprint data acquired from an individual's personal BID.

The fifth is a verifier score. For example, an initial, primary ID verification verifier with a higher verifier score will yield a presenter a higher ID verification score since a verifier with a higher score is more trustworthy than a verifier with a lower score.

The sixth factor is testaments presented on behalf of the presenter. A testament to a presenter's identity is made in various forms by various persons or entities. For example, a testament provided by a presenter's bank would yield a higher score than a testament provided by a presenter's friend.

A score for each of these variables is determined and is then multiplied by the percentage of importance that variable is given within the system. To determine the presenter's initial ID verification score, the results of those variables are multiplied by their importance in the system and are then added to determine the presenter's initial ID verification score. For example, an equation for determining a presenter's initial ID verification score resembles the following:

$$u(a_1+\ldots+a_\_)+v(b_1+\ldots+b_\_)+w(c_1+\ldots+c_\_)+$$
$$x(d_1+\ldots+d_\_)+y(e_1+\ldots+e_\_)+z$$
$$(f_1+\ldots+f_\_)=m_{initial}$$

In the above equation, "a" represents the score associated with how pieces of ID verifying information are presented, with "_" indicating the number of such pieces; "u" represents the weighting coefficient assigned to variable "a"; "b" represents the score associated with the type of identification document a presenter presents, with "_" indicating the number of such documents presented; "v" represents the weighting coefficient assigned to variable "b"; "c" represents the score associated with the verifiability of the identity information provided by the presenter; "w" represents the weighting coefficient assigned to variable "c"; "d" represents the method in which enrollment is conducted, with "_" indicating the number of such enrollments; "x" represents the weighting coefficient assigned to variable "d"; "e" represents the score assigned to the verifier verifying a primary ID verification, with "_" indicating the number of such verifiers; "y" represents the weighting coefficient assigned to variable "e"; "f" represents the score assigned to testaments presented by other individuals or entities on behalf of the presenter, with "_" indicating the number of such testaments; "z" represents the weighting coefficient assigned to variable "f"; and "$m_{initial}$" represents the presenter's initial ID verification score as a result of a primary ID verification. In an additional embodiment, the system is configured to incorporate more or fewer factors into determining a presenter's initial identity score. Adding factors to or taking factors from the calculation of a presenter's initial identity score would lend to a more secure or less secure system.

The equation for determining a presenter's ID verification score during subsequent primary ID verifications is similar to the above equation. In such verifications, the various factors introduced in the primary verification are multiplied by the percentage weight they are assigned and then added to the presenter's initial primary ID verification score. Should the presenter conduct a secondary ID verification between the time of their initial primary verification and any subsequent primary verification, the factors introduced in the new primary verification are multiplied by the percentage weight they are assigned and then added to the presenter's evolving score, which is discussed in greater detail below.

Continuing with FIG. 2, the presenter is prompted to provide identity verifying information and at least one biometric sample 204. In an additional embodiment, the presenter provides a SID. According to an optional embodiment, the presenter provides one or more financial accounts to link to the identity verifying record for which they are enrolling. This financial account enables the presenter, once enrolled in the system, to authorize payment for purchases through biometric authorization.

Further initial identity verification such as scanning and storing multiple biometrics, capturing a digital photo of the presenter, seeking further identity verification from other presenters enrolled in the system via an online or offline information request, or compiling a digital video recording of the presenter reading a statement so that a remote party or parties may review the video may also be performed.

The presenter's biometric sample is entered via a biometric scanner. This sample is then translated to and stored in template form. Template forms of scanned biometrics may be used for biometric comparisons under most circumstances. In an additional embodiment, the digital scan of the biometric is itself also stored in the central database. Such an embodiment that also stores the biometric digital scan is useful for reasons such as, but without limitation, biometric matching purposes, security procedures (in the case of an individual attempting to fraudulently access the system), or information protection in the event database information is lost or templates need to be re-constructed due to hardware revisions.

The system may optionally be configured to allow a presenter to register more than one type of biometric sample or two or more of the same type of biometric during enrollment. For example, the invention's system may be configured to accept a fingerprint biometric along with a face scan biometric, or the system may be configured to allow the presenter to register finger scans from more than one finger. Storing a biometric template in the presenter's system record that includes data from more than one biometric sample type enables that presenter the convenience of presenting any one of the presenter's previously scanned biometrics for identity verification, record access authorization, or even for funds transfer utilizing a system according to the present invention. Such an embodiment also allows another factor by which to assess a presenter's ID verification score. For example, a presenter enrolling into the system with scans of multiple biometrics affects a higher ID verification score than a presenter who only scans one biometric.

According to many embodiments of the present invention, an SID is used. The SID is a number used to help identify registered individuals in the invention's system. This SID is not equivalent to a PIN (Personal Identification Number) used for financial ATM (Automated Teller Machine) and debit transactions. Rather, the SID simplifies the verification of the biometric sample. The SID may be a unique number (a number with no chance of being honestly duplicated, e.g. cell phone number or social security number), reasonably unique number (a number with a statistically small chance of being duplicated), or a non-unique number (a number with a large chance of being duplicated). While a SID comprising a unique number will inherently provide more security, the present invention is not so limited.

According to an alternative embodiment, a secondary ID number is utilized in the event that an individual does not remember the SID. In this embodiment, the secondary ID number is any number a registered individual registered during enrollment, such as, but not limited to, a home phone number, work phone number, social security number, or driver's license number. Like an SID, a secondary ID could also be any combination of alphanumeric characters, such as a phone number, name, password, or the like, and need not be limited to a number.

According to another alternative embodiment, if the presenter chooses to link a financial account with their identity verifying record, financial account information is entered via magnetic stripe read, hand keying, or another input method. Checking account information is entered by a magnetic ink character recognition (MICR) read, an optical character recognition (OCR) read, hand keying, or entered by another method of input. The method of information input is also recorded for each enrollment. In an alternate embodiment, the system may be configured to take a digital image of the monetary-representative token the presenter normally uses to access the presented financial account and store this digital scan in the presenter's system record. Financial accounts linked with identity records may be used for identity score updates. By way of illustration and not as a limitation, it is feasible that embodiments of the present invention be utilized to facilitate biometrically authorized financial transactions for a system and method such as that described in co-pending utility application Ser. No. 10/251,305, filed on Sep. 20, 2002, having common inventorship with this application.

Continuing with the enrollment process, after presenter data is entered, all data entered is transmitted to the central database 206. The presenter's data is compared to negative data held in the central database to check for potential fraudulence 210. This check helps alert the system to potentially fraudulent enrollments. In an additional embodiment, the system checks for re-enrollment, which is facilitated by the central database searching data contained therein to verify that one or more presumed unique parts of the enrolling presenter's data is not already enrolled in the system of the invention. If the enrolling presenter's data is not found in the enrolled records in the system, the enrollment process continues. If, however, the compared information is found in the database, the database either notifies the verifier of the match to allow them to decide enrollment allowance, or the database automatically declines the enrollment. In the verifier powered embodiment, the process further comprises displaying to the verifier the field(s) or entire record(s) wherein those duplicate fields are held. This enables the verifier to decide whether or not to accept an enrollment in certain situations, such as but not limited to where only select information is duplicated, such as a phone number or address. Also in this embodiment, a verifier is permitted to set parameters that automatically accept or decline an enrollment based on the verifier's decided criteria. This configuration provides verifiers with the convenience of auto-accept or auto-decline while providing them with the control of their own identity verification parameters.

If there is a discrepancy between previously stored information and the current information, the verifier could request that the presenter explain such a discrepancy. For example, the address provided during the current enrollment could not match the address the system already has on record. The verifier could then ask the presenter to explain why his current address does not match previously stored information. The presenter could have previously provided an address but later relocated, and thus the current address he provided does not match. In one scenario, the system could provide the verifier with specific out-of-wallet questions based upon the discrepancy. Discrepant information could indicate fraudulent behavior. For example, an individual could have fraudulently enrolled himself as the presenter, or the presenter could be attempting to fraudulently enroll himself as someone else. In addition to answering out-of-wallet questions, the presenter could be asked to undergo further verification steps to substantiate his identity, such as by providing another biometric scan or further identity documents or testaments. A presenter's system record could be marked pending until the presenter provides sufficient information to confirm his identity. In one scenario, a presenter with a system record marked pending could be allowed to utilize the system, but with a lower identity verification score and/or limited functionality. Alternatively, his score could be unaffected, but could include an indicator, such as an asterisk, to inform other parties that the score is based upon a pending system record.

Once the presenter's information is entered, all information entered is evaluated to determine the presenter's initial identity verification score 212. Once the presenter has been assigned an identity verification score, the record data is stored 218. If the enrolling presenter's data is found during the fraudulence check, the enrollment is automatically declined 220 by the central database. In an additional embodiment, if the enrollment is declined 220, whether it is declined by the central database, the verifier, or verifier pre-set parameters, the presenter is given the opportunity to call a customer service facility to explain discrepancies or misunderstandings.

Once a presenter is enrolled in the system of the invention, their ID verification score evolves based upon the history of their actions within the system. Presenters may request additional primary identity verifications to attempt to raise their ID verification score or they may affect their score simply by using the system for secondary ID verifications. By way of illustration and not as limitation, one embodiment of the system offers presenters seven different methods of affecting their ID verification score.

The first method in which a presenter may affect their ID verification score is to complete an "active verification" procedure asked of them via a written correspondence from a system manager. For example, the system manager might send an enrolled presenter a letter, relaying information that the presenter must use to verify themselves with the system. Or, a presenter may be asked to present information to various out-of-wallet questions that may be double-checked with a 3rd party database.

The second method in which a presenter may affect their ID verification score is to confirm their identity through their affiliation with a 3rd party entity. For example, the presenter presents the system with information related to a 3rd party entity, such as a bank wherein the presenter holds an account. The system relays information to that bank, which the bank must then relay to the presenter. A simple example of this procedure would be the system depositing a small amount of money into a presenter's bank account, the amount of the deposit being information the presenter must provide to the system for verification.

The third method in which a presenter may affect their ID verification score is to confirm their identity through a 3rd party personal verification. For example, the system would collect contact information for the 3rd party from the presenter. The system would then contact the 3rd party in some manner to deliver information that the 3rd party would then have to deliver back to the system in a specified manner, such as logging onto a website and typing in information provided.

In one embodiment, a third party can provide a testament to a presenter's identity via a mobile device, such as a cell phone or PDA. The third party and/or presenter could use a BID incorporated with his device, such as a camera or fingerprint scanner, to provide his own biometric data and/or that of the other participant and transmit it to the system for storage and/or verification. Alternatively, one or both the participants could use a stationary device, such as a personal computer equipped with a BID, such as a web camera or fingerprint scanner. For example, the third party could use his camera phone to take a picture of the presenter and transmit the picture to the system. The device employed could be identified via caller ID or a device identifier. The system could then store the data and/or determine if it matches previously enrolled data.

The system could verify the participants are in proximity to each other or a particular location to reinforce the reliability of such ID verifications. In one scenario after one participant has used his device to acquire another's biometric data, he can transmit the data via a limited range transmission medium to the other participant's device, which could in turn transmit it to the system. Connections with a limited range, such as via a wire or Bluetooth, could indicate that the two individuals are within proximity of each other and therefore the verification could have greater impact on the presenter's identity verification score. In addition to, or in place of, employing biometric data for proximity verification, the system could transmit an indicator to the presenter's or third-party's device, which could then be conveyed to the other participant's device and transmitted back to the system. For example, the system could play a tone on the third party's mobile phone while it is held near the presenter's phone, which could then transmit this tone back to the system. As another example, an image could be displayed on the third party's device and then transmitted to the presenter's device (e.g., the presenter could use his camera phone to take a picture of the image or could acquire the image via Bluetooth), and then the image could be sent back to the system. If the indicator received by the system matches the one it transmitted, it could determine that the two people are in proximity to one another. Additionally, for any type of identity verification, the system could utilize tracking features, such as caller ID, GPS, triangulation, and the like, to determine the location of the device employed and/or whose device was used. The presenter and third party could be asked to be in a particular location when performing this type of verification and the system could use a tracking services to verify that they are in the designated location. In one embodiment, if a participant's device has photograph functionality, a picture of the location could be acquired and transmitted to the system for location verification. For example, the presenter or third party could use his camera phone to take a picture of a nearby landmark or the storefront of a designated merchant location. Alternatively, if a verifier is present, he could validate their presence via his own POV. Additionally, the presenter and the third party could be asked to provide this type of testament on a particular day and/or at a particular time.

The fourth method in which a presenter may affect their ID verification score is to verify their identity through a 3rd party's affiliate. For example, the presenter would present information pertaining to a 3rd party and that third party would have to then verify the presenter through a party that 3rd party is affiliated with, such as a bank. The 3rd party would then present verifying information about the presenter to the 3rd party's bank, and the bank would present the presenter's verifying information provided by the 3rd party to the system.

The fifth method in which a presenter may affect their ID verification score is to conduct secondary ID verifications with the system. A presenter has a chance to affect their ID verification score every time they use the system to verify their identity. If a presenter verifies their identity often and successfully via secondary ID verification procedures, their ID verification score increases, and if a presenter does not verify their identity successfully or often via secondary ID verification procedures, their ID verification score decreases. A secondary ID verification can include a variety of transactions, such as a financial transaction, electronic correspondence (e.g., email, online chat, instant messaging, fax, etc.), an access transaction (physical or virtual), age-verification, educational testing, drug screening, or the like. For example, the presenter could undergo a secondary ID verification to conduct a purchase, check into a hotel, gain access to a nightclub, log his attendance at a classroom or worksite, or the like.

Similarly, the sixth method in which a presenter may affect their ID verification score relates to the type of secondary ID verification for which the presenter is verifying their ID. For example, a presenter's ID verification score will increase more quickly with more risky secondary ID verifications such as verifications for home loans or car purchases, than they would with a visit to the grocery store to cash a check.

A score for each of these evolving identification procedures is determined and is then multiplied by the percentage of importance that procedure is given within the system. To determine the presenter's evolved ID verification score, the results of those procedures are multiplied by their importance in the system and are then added to the presenter's previous ID verification score. For example, an equation for determining a presenter's evolving ID verification score in resembles the following:

$$m_{n-1} + t(g_1 + \ldots + g_n) + s(i_1 + \ldots + i_n) + r(j_1 + \ldots + j_n) + q(k_1 + \ldots + k_n) + p(l_1 + \ldots + l_n) + P(L_1 + \ldots + L_n) = m_n$$

In the above equation, "$m_{n-1}$" represents the initial, primary ID verification score or the most recently assessed evolving score assigned to the presenter; "g" represents the score associated with an active verification; "t" represents the percentage weight assigned to variable "g"; "i" represents the score associated with an affiliated $3^{rd}$ party entity verification; "s" represents the percentage weight assigned to variable "i"; "j" represents the score associated with a $3^{rd}$ party personal verification; "r" represents the percentage weight assigned to variable "j"; "k" represents the score affiliated with a $3^{rd}$ party removed verification; "q" represents the percentage weight assigned to variable "k"; "l" represents the score assigned to a transaction; "p" represents the percentage weight assigned to variable "l"; "L" represents the magnitude of each transaction; "P" represents the percentage weight assigned to variable "L"; and "$m_n$" represents the presenter's newly evolved ID verification score. In an additional embodiment, the system is configured to incorporate more or fewer factors in determining a presenter's identity score. Adding factors to or taking factors from the calculation of a presenter's initial identity score would lend to a more secure or less secure system.

In one embodiment, in addition to adjusting a presenter's identity verification score during enrollments and transactions, the system could subsequently retrieve data from third party sources to update a presenter's identity verification score. This update could transpire periodically (e.g., once a month, randomly, etc.). For example, the system could periodically communicate with a criminal database to search for criminal records associated with presenters. In another illustration, the system could periodically retrieve presenter credit score information from financial services such as ChoicePoint, Equifax, or Acxiom. In another embodiment, a third party update could occur upon request from a presenter, verifier, system manager, or the like. For example, a presenter aware that points were removed from his driving record could access the system (e.g., via a system website) and request that his score be updated, hoping that the system will examine data from a Department of Motor Vehicles database and increase his score accordingly. In one scenario, the update initiator could specify which database(s) to examine. Continuing the example, the presenter could request that the system examine the Department of Motor Vehicles database. Similarly, a verifier or system manager suspicious of a presenter, perhaps due to questionable behavior or complaints, could initiate an update to determine if new negative information has been stored at connected third party databases. In another scenario, a third party linked to the system could trigger updates. For example, an educational institution could notify the system that the presenter has recently undergone drug testing or educational testing, and the system could thus perform a third party update to add this data to the identity verification score. As with other information affecting an identity verification score, the type of third party data received during an update could determine its impact on the score. For example, data obtained from a police database would be more influential than data from a library database. The system could evaluate third party data by the legitimacy of its source. For example, data obtained from a government-endorsed trusted traveler program could be rated higher than data obtained from a conventional airline customer database.

In one embodiment, all information employed for identity verification score generation, either during enrollment or subsequently, could be associated with biometric data. Information associated with biometric data could be more difficult to dispute and, thus, determined to be more reliable. For example, a presenter's credit history could include a variety of transactions, some associated with biometric data and some not. Because those conducted with the use of biometric data could be deemed more reliable, an identity verification score could be based solely on such transactions. This could be a standard policy for the identity verification system, or a biometric-only score could be requested by a party involved in a transaction with the presenter. Alternatively, transactions conducted without the use of biometric data could still be used in identity verification score generation, but could have a lesser effect on the score.

Once a presenter and/or verifier is enrolled in the system of the invention, they may access their system records for maintenance purposes. Such maintenance of a system record includes actions such as updating personal information (e.g., address and phone number) and setting personal privacy preferences. Personal privacy preferences allow presenters and verifiers to restrict access of their system records to specified parties. By way of illustration and not as a limitation, if a presenter does not want a clerk at a convenience store to be able to access the presenter's system record, perhaps because the presenter never does business at a convenience store, the presenter selects to deny access to all verifiers with a convenience store as their registered location.

In an additional embodiment of the enrollment process, the verifier identifies themselves to the system by entering their biometric and/or SID before an enrollment begins. This embodiment prompts the verifier to re-enter their biometric or SID after the presenter's information has been entered in order to certify that they have checked the identification the enroller has provided. If the enrollment is being conducted by an automated verifier, this verifier uses a special code to identify itself to the system. In a further additional embodiment, the biometric and/or SID a verifier enters into the system during a primary verification is stored in the presenter records verified by that verifier. Such a feature allows the system to keep track of the presenters a verifier has verified.

Additionally, verifier records may include storage of the SID and/or biometric of the presenters for which they perform primary verifications. Such a feature also allows other verifiers to set secondary verification parameters that than allows them to accept/decline a secondary ID verification based on the verifier info stored in a presenter's record.

In yet a further additional embodiment, a score is associated with a verifier identification record. This score might simply indicate the verifier's security status, which relates to their position (e.g., on a scale of 1-to-10, if the verifier is a law enforcement official, they may have a score of 10, whereas the clerk at a convenience store may have a score of 1.) Additionally, this security status sets that verifier's operating parameters within the system. As a matter of illustration, and without limitation, verifiers who have an ID score lower than 7 would not be authorized to perform ID verifications of a presenter who is applying for a $100,000 loan. This verifier score optionally is considered in assessing a presenter score associated with a presenter that the specific verifier is enrolling into the system of the invention.

In an additional embodiment, an enrolling presenter authorizes all or a portion of verifiers enrolled in the system of the invention to access their presenter identity verification record during an identity verification transaction. This authentication agreement is formed between the presenter and the verifier(s) by the presenter providing their biometric scan as a digital signature to an electronic contract between the presenter and the select verifier(s) and gives the select verifier(s) access permission to the presenter's system record. Presenters may authorize similar agreements for credit checks. This authorization feature may also be used to authorize transfers of finances in a system in which presenters perform financial transactions through their system identity verifying record.

Figure 3:
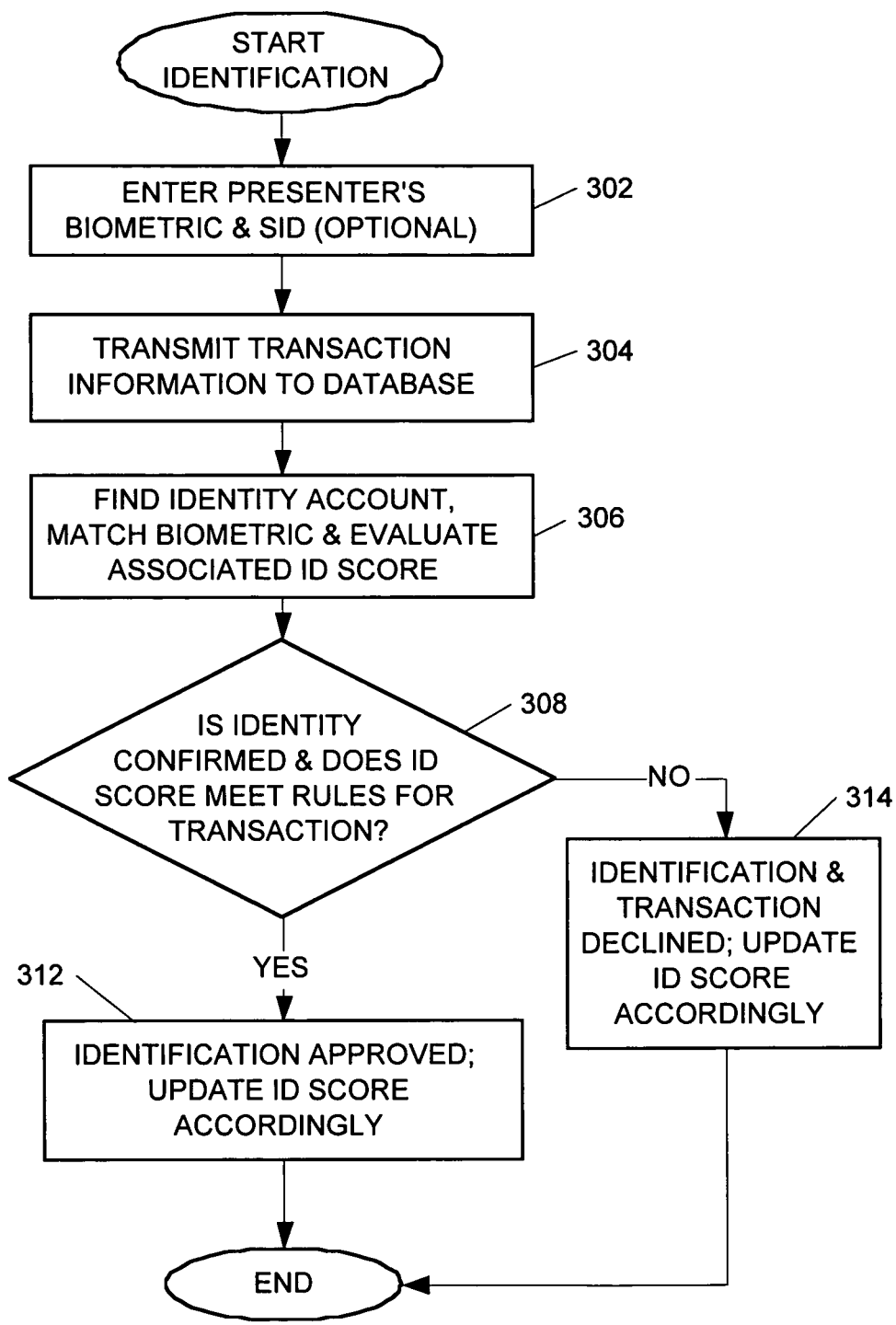
FIG. 3 illustrates a flowchart of a process for presenter identity verification using an identity verification system according to an embodiment of the present invention.

Referring to FIG. 3, a flowchart of a secondary identity verification transaction is illustrated. The presenter enters their biometric (herein referred to as the "transaction biometric") 302. The presenter optionally enters their SID. This information is sent to the central database 304. Additional transaction information may also be sent to the central database such as but without limitation POV location information, merchant ID information, verifier ID information, transaction type, terminal ID, and time. The presenter's identity record is found 306. The transaction biometric and the registered biometric of the selected record are compared, and the ID score held in the selected record is evaluated 308. If the transaction biometric and stored biometric are a match and the corresponding identity score meets transaction rules, identity is verified, the transaction is approved (to the extent identity is useful for the transaction), the presenter's identity score is updated within the central database, and the presenter and verifier are notified 312. Parameters within the central database automatically determine whether or not the presenter's ID score is high enough for transaction approval.

In an additional embodiment, verifiers set within the central database further auto-determination parameters to evaluate a transaction against. By way of illustration, and not as a limitation, one such further auto-determination parameter includes the central database prompting the verifier to double check a presenter's first five verifications by viewing a picture ID.

The presenter's identification score is updated according to the outcome of the transaction. If the transaction is rejected, the reason for such a rejection could be but is not limited to a false negative match of biometrics, incorrect data entry, a fraudulent attempt to access the system, or the presenter's identification record not meeting transaction parameters. Since the first two reasons for transaction failure are not necessarily the presenter's fault, these transaction rejections are not factored into a presenter's identification score. Fraudulent attempts to access the system, however, are logged and affect the presenter's record. Alternatively, if the presenter does not have a record, the system captures the presenter's fingerprint and stores it in the fraudulent database. If the presenter's identity score does not meet transaction parameters, the verification is declined and the presenter's identity verification score is updated accordingly 314. The verifier and presenter are each notified of the transaction outcome.

Additional embodiments of the ID verification process include the verifier conducting the transaction to enter their biometric or their biometric and SID. This information is also used so the verifier can identify themselves to the system. It is used as a way to track a verifier's actions within the system. Additionally, this feature is used to track the verifier's transaction success rate within the system.

Figure 4:
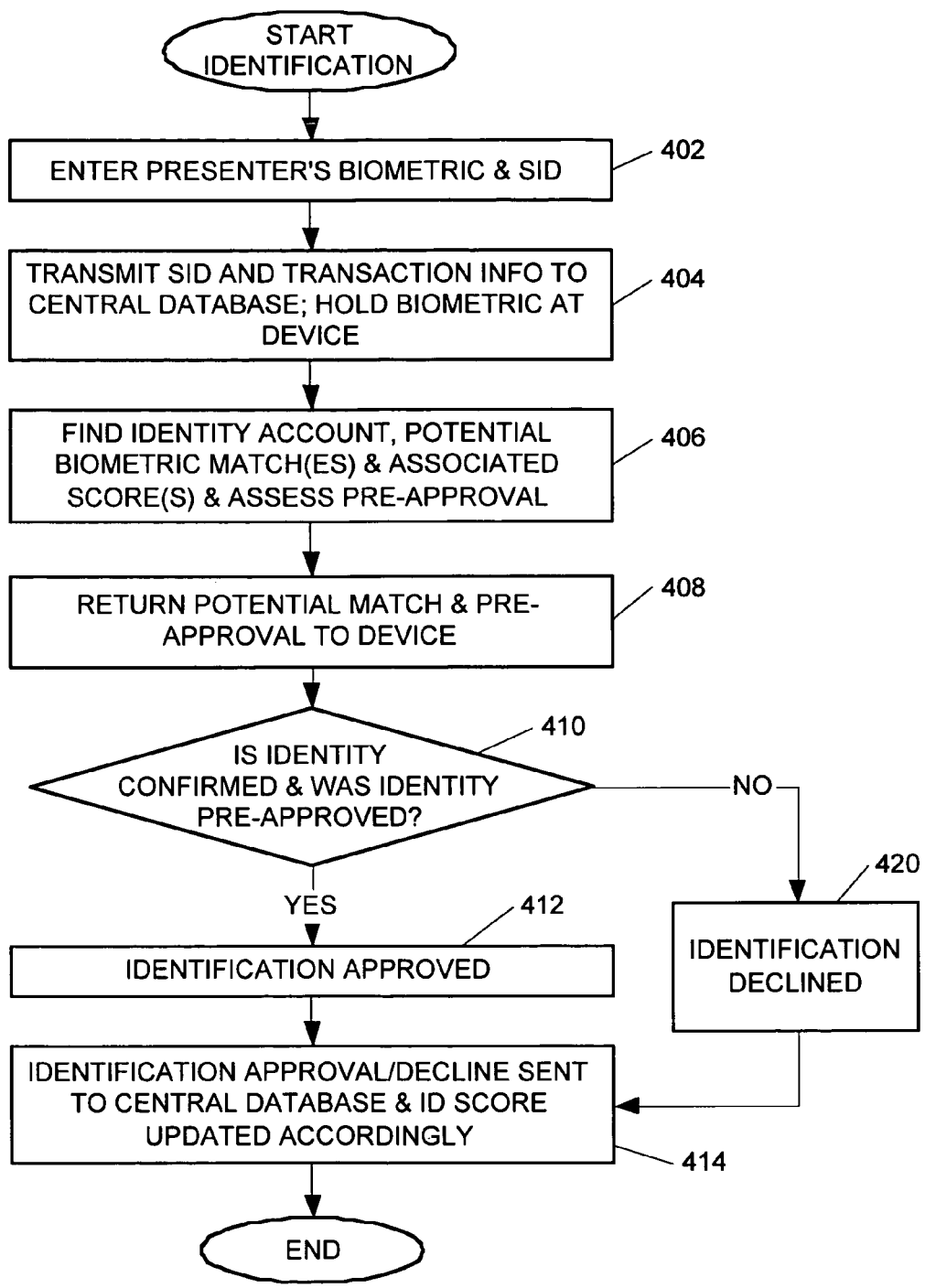
FIG. 4 illustrates a flowchart of a process for presenter identity verification with local biometric matching using an identity verification system according to an embodiment of the present invention.

Referring to FIG. 4, a flowchart of an identity verification with local biometric matching is illustrated. The presenter's SID and biometric are entered into the local device 402. The presenter's SID is sent to the central database 404. Additional transaction information may also be sent to the system's central database such as transaction type, terminal ID, and time. Once a potentially matching presenter's identity record is found in the central database, the biometric information stored therein is pulled and its associated score is evaluated to determine whether the identity verification will be approved or declined 406. If the potential presenter ID score is at or above the pre-set level for the ID verification, the biometric that is sent back to the local device for matching is flagged to indicate that the ID transaction had been pre-approved. However, if the potential presenter ID score is not at or above the pre-set approved score, the biometric sent to the local device will not be flagged, which will indicate to the local device that the ID verification was pre-declined.

The potentially matching biometric and its pre-approval/pre-decline indication are returned to the local device 408, where the biometric is compared to the transaction biometric information temporarily held at the local device 410. If a pre-approval indication was returned to the local device and the transaction biometric matches the one returned to the device, the identification is approved 412. Once a pre-approval indication is associated with a potential biometric match, if that biometric matches the transaction biometric, the transaction is automatically approved and notice of the transaction approval is sent to the central database 414. The presenter's identity score is updated reflecting the recently approved ID verification. If the ID verification was pre-declined or if the biometric returned to the local device does not match the transaction biometric, the ID verification is declined 416. A notice of the decline is sent to the central database and the presenter's ID score is updated accordingly 414. In an alternate embodiment, approval and decline updates with the system are performed after the approval/decline has been executed. These approvals and declines may occur at the end of a designated batch of transactions, such as at the end of the day.

In an additional embodiment, the system is configured to return the score associated with a potentially matching biometric to the local device. Here the verifier chooses whether to approve or decline the transaction if the central database has pre-declined a transaction. If the system is configured to allow the verifier to approve or decline a transaction resulting from such a match, the verifier either manually selects to accept or decline the transaction or the verifier sets pre-approval parameters that automatically approve or decline the transaction.

In one embodiment, the system is configured to transmit the presenter's identity verification score to the local device regardless of local or central biometric matching and/or without a pre-approval/pre-decline indication. Once a presenter is successfully identified, either locally or centrally, the system can provide the verifier with the presenter's identity verification score so that the verifier can decide to accept or decline the transaction.

A presenter's identity verification score can be presented in a variety of formats, including a visual representation, such as a percentage, a number, an icon, text, a light, and/or an audio representation, such as a tone or audio message, or the like. In one scenario, the identity verification score is displayed as a percentage, in which the higher the percentage, the more positive data the system has regarding the presenter. Conversely, the percentage could work in an opposite fashion, in which a high percentage could indicate a presenter's legitimacy is suspect. The identity verification score could be presented as a rating, such as on a scale of one to ten. For example, a presenter with an identity verification score rating of ten could be considered more reliable than a presenter with an identity verification score rating of five. The system could present a presenter's identity verification score as an icon. For example, if a presenter's identity verification score exceeds a system requirement, it could be represented by a thumbs-up icon, whereas a poor score could be represented by a thumbs-down icon. An icon method need not be limited to a simple positive/negative affirmation, as the system could use various icons to demonstrate different levels of presenter legitimacy. For example, a mediocre identity verification score could be shown as a thumbs-sideways icon. In another scenario, the system could use various smiley faces to illustrate a presenter's identity verification score, each with different expressions representative of various identity verification score levels. For example, an excellent identity verification score could result in a big smile, whereas, a poor identity verification score could be shown as a large frown. Identity verification scores could be presented as text. For example, the system could employ a grading scale similar to what is used for school work grading. An "A" could represent an excellent identity verification score, a "C" could represent a mediocre score, and an "F" could represent a poor score. A text representation of the identity verification score could also be a phrase. For example, if the presenter has a good identity verification score, the system could present him as "highly reliable." Mediocre scores could be shown as "somewhat reliable" and poor scores could be shown as "unreliable." The system could display the identity verification score as a message, such as "The system has determined that Angelina Jolie is who she claims to be," or "The system has determined that Angelina Jolie is likely to be who she claims to be," or "The system is uncertain of Angelina Jolie's legitimacy." In another scenario, a presenter's identity verification score could be communicated by a particular light displayed at the local device. For example, a green light could indicate the presenter has a high score, a yellow light could indicate a mediocre score, and a red light could indicate a questionable score. In one scenario, the system could display a flash of light or a sequence of light flashes to indicate a particular identity verification score or score level. The use of light flashes could be useful for visually-impaired individuals who cannot discern particulars, but who can detect changes in light.

In addition to, or in place of, visual representations, the system could use audio signals to communicate a presenter's identity verification score. For example, the system could play a different tone dependent upon the presenter's score, with each tone indicating a particular identity verification score level. In another scenario, the system could play an audio message, such as "Angelina Jolie has a score of 83%." Audio signals could be delivered in conjunction with a visual representation, and thus a message could be received both audibly and visually. An audio representation of identity verification score could be implemented per the particular individual. For example, audio representations could be played for visually-impaired participants.

In a further additional embodiment of the verifier-powered configuration, the local device is configured to display a warning message, a warning message containing a reason the transaction might be declined by the invention's system, or a warning message with a reason for potential decline and a section or all of the presenter's system record. Such information provides the verifier with additional information upon which to base their transaction decision.

Once an approval or decline has been made, the local device informs the presenter of their transaction results via digital display or printed receipt. In an additional embodiment, the system is configured to print or display to the presenter a reason that their transaction was declined and a phone number to a customer service center to call for further explanation.

In yet a further additional embodiment, secondary ID verifications may prompt the verifier conducting the transaction to identify themselves to the system by entering their biometric and/or SID. This step may be used to identify the verifier in order to evaluate their performance in the system. In a further embodiment, the verifier score might also be used as an additional element that affects the presenter's score when the verifier is conducting a secondary ID verification transaction. Likewise, the ID scores of presenters might affect their initial verifier's performance score.

Following is a description of various additional embodiments and methods of the system.

In an additional embodiment, the system also comprises an age-verification feature. This feature allows verifiers to verify a presenter's age if that presenter is attempting to identify themselves for entrance to an age-restricted area, for access to age-restricted privileges, or for purchase of age-regulated items, such as cigarettes or alcohol. Biometrically authorized age verifications may advantageously be conducted as described in utility application Ser. No. 10/369,235, filed on Feb. 19, 2003 and having common inventorship with this application, which is incorporated herein by reference.

In embodiments wherein a presenter enters a SID in conjunction with their biometric, it is conceived that the SID and biometric entries may be combined into one action wherein the system is equipped for voice recognition. In such an embodiment, a presenter speaks their SID, thereby entering both their biometric sample, a voice scan, and their SID at the same time.

It is also an additional embodiment of the present invention for records enrolled at a specific verifier to be recorded and stored on the verifier's local database before the information is transmitted to and stored on the invention's central database. Such storage is used for information back up and for biometric matching purposes for presenters who enrolled with said verifier's devices in the event that the system's central database is unavailable for information access. In such an embodiment, the verifier's devices may also be configured to communicate directly with the local database at any one or all of the transmission or reception steps within the enrollment or transaction processes instead of communicating with the system's central database. This embodiment permits the verifier to later connecting with the invention's central database to update newly enrolled records within said central database, to update identity and performance scores, and to authorize money transfers from transactions logged earlier in the day.

An additional embodiment of the invention comprises encrypting information transferred between two points in the system. For purposes of example and without limitation, transaction information may be encrypted at one point and sent across a non-secure connection between the points or not encrypted at a point of communication but sent to the other point of communication across a secure connection. Encryption and decryption of said messages may be monitored by services provided by a company such as VeriSign. As an added level of security, one alternate embodiment encrypts even information internal to a terminal and which is never transmitted in a communication. This prevents retrieval of sensitive information (e.g., data corresponding to a biometric scan) from a stolen terminal.

An additional embodiment of the present invention allows presenters to boost their ID verification scores by presenting a number of electronic references. These references may be other presenters the presenter knows and who are enrolled in the system or may be people who are planning to enroll in the system in the near future. Presenters who link such references to their ID verification record receive an ID verification score boost once all references are proved as enrolled in the system.

Additionally, presenters who link such references to their ID verification record authorize the system to allow their ID score to be affected by the scores of these references and vice versa. Therefore, if the presenter selects references who maintain a high ID verification score within the system, the presenter's ID score increases. However, if the presenter selects references who have low ID verification scores within the system, the presenter's ID score decreases. Likewise, the presenter's ID score affects the ID scores of their references. Therefore, as long as the presenter maintains a high ID verification score, the presenter's references receive an ID score boost. However, if the presenter maintains a low ID verification score or commits fraud within the system, the scores of the presenter's references are negatively affected.

In addition to a presenter's identity verification score fluctuating per the references linked to his system record, the score could change per the system record information employed. If during a transaction or system record update the presenter modifies the information to be used (e.g., selects a different financial account or mailing address), his identity verification score could change accordingly. Transactions conducted with new system record information could be of greater risk than those conducted with established system record information. For example, a presenter could establish an excellent identity verification score based, at least in part, upon a particular financial account he employs for financial transactions. However, if the presenter switches to a different financial account, his identity verification score could change to reflect the lack of information associated with the new financial account. Likewise, a presenter could establish a good identity verification score while claiming to be at a particular address. If he changes addresses (e.g., provides a new mailing address, relocates, etc.), the score could drop because the address has not been validated (e.g., through successful deliveries, a matching billing address, etc.). In one embodiment, the system could attempt to verify the new information. A successful verification could lessen the negative impact a change has on the presenter's identity verification score. For example, the authenticity of a mailing address could be determined by the amount of items previously shipped to it, shipping records (e.g., UPS tracking history), the type of address (e.g., a street address, a P.O. Box, a Mail Boxes Etc. box), via information stored at a third party database, or the like. Additionally, the system could use an address verification service (AVS) to compare a new address to a registered address. The registered address could be stored by the system or could be stored with a third party, such as a financial service (e.g., a billing address on record with the credit card company).

The ability to select which data is used in identity verification score generation could be a privacy control. For example, a presenter paying cash for a purchase transaction could provide his left thumb to associate his purchase with his biometric data for return purposes. That is, the presenter could associate his left thumb biometric with the purchase so that he could provide it in place of a sales receipt if he returns the item. The presenter could opt to use his left thumb because it is not associated with other transaction types and he does not want the merchant to have access to other information in his system record (i.e., information associated with other types of transactions).

In one scenario, if the presenter is able to select the information used for his identity verification score, the system or verifier could evaluate which data was selected and which data was not. This could be necessary to prevent presenter fraud. For example, a presenter with a poor credit rating applying for a loan could opt not to include the rating in his identity verification score in order to have a higher score. The loan processor could have authority to review which information the presenter included in his score and thereby recognize that the presenter chose not to include his credit rating. While access to the unselected information could be restricted, the verifier could be informed which information was not included and act accordingly. The verifier could request the presenter add unselected information to his identity verification score or could decline the associated transaction. As another illustration, the verifier could be notified that the presenter typically employs iris scan data when conducting transactions, but opted to use fingerprint data for the current transaction. This change in behavior could indicate that another individual is attempting to use the presenter's system record fraudulently.

In an additional embodiment, if a presenter authorizes all or a portion of verifiers enrolled in the system to access his system record, his score could vary per the record data selected by the verifier. For example, if the presenter's identity verification score is to be used by a car rental agency to authorize the presenter, the car rental agency could request an identity verification score reflective of relevant information, such as the presenter's driving history, car rental history, and the like. As another illustration, if presenter's identity is being verified in conjunction with a loan application, the loan processor could request a score based upon the presenter's loan history, credit card information, and bill payments.

In one embodiment, a presenter's identity verification score could vary per the terms of the associated transaction. For example, the terms of a purchase transaction could allow the presenter to pay for the product over a 30 day period. The system could evaluate the presenter's purchase transaction history to determine if he has participated in similar payment plans and utilize his performance in such plans to generate his identity verification score for the current transaction.

In one embodiment, the entity that has authority to choose the information used for the identity verification score could be determined by the associated transaction. For example, for a low-value purchase, the presenter could be authorized to select which information is utilized, but for a high-risk transaction, such as a loan application or high-value purchase, the verifier or the system could have the authorization. In one scenario, the presenter's identity verification score is generated on a per transaction basis based upon the appropriate system record information. In another scenario, the system record could contain sub-scores for various transaction types. For example, a presenter could have an email score, a high-value purchase score, a physical world purchase score, an online purchase score, a physical world access score, and the like. These sub-scores could be generated at the time of transaction or could be pre-generated. For example, the system could access specific sources for sub-score generation when a particular type of transaction is initiated, or the system could maintain a sub-score to be used immediately when a particular transaction type is initiated, perhaps updating the sub-score on a periodic basis.

An additional feature of the present invention comprises allowing an individual enrolling in the system of the invention the ability to register a password that in conjunction with their system ID allows them to perform record maintenance of their system record over the Internet from a remote device or from a Point of Sale (POS) or POV device which does not have a connected BID. The password could be associated with a non-biometric identifier, such as an identification token, an identification token number (e.g., driver's license number), a login name (e.g., eBay login name), or the like. In one embodiment, such a system could be offered to presenters with nonviable biometric data. For example, an individual could lack the biometric (e.g., missing a limb) utilized by the identity verification system. For such individuals, the aforementioned non-biometric means could allow them to participate in the system. The system could maintain a non-biometric identity verification score as an alternative for those who cannot use their biometric data. Furthermore, a non-biometric identity score could be offered to individuals that refuse to employ their biometric data, but insist on having access to the system.

Another embodiment of the invention comprises the central database providing presenters and verifiers with system ID suggestions if their entered system ID is already registered within the system. These suggested IDs are envisioned as system IDs that are not already registered in the system but are similar to the system ID the presenter or verifier originally entered.

An additional feature of the system allows direct transition from an enrollment into a transaction using POV or POS devices without starting a new transaction. This allows a presenter to enroll into the system just before they identify themselves or purchase an item without having to reenter their biometric and SID.

According to another hybrid embodiment, all or select enrollment and identification methods may additionally comprise printing a paper receipt of the system activity performed during the system access. Information included on this receipt may be any information pertinent to the transaction type, including but not limited to date, transaction number, financial account used, the invention's customer service phone number, instructions on how to contact the invention's customer service, verifier info, or other transaction information.

It is also an alternate embodiment of the present invention to provide verifiers with presenter and other verifier profile reports in case of suspected fraudulent activity. These reports may be customized to display selected information from a verifier's or presenter's identity record history or record.

According to another hybrid embodiment, the system may be configured to send the local device's TID along with transaction information for presenter security purposes. If the TID is not registered with the invention's central database, the presenter's information is not processed. Optionally, the local device display may give the presenter a system customer service number to call and a transaction code to reference during the call, so they may find out why the transaction was declined. Furthermore, information associated with the TID, or another device characteristic, could be reflected in the identity verification score. The more reliable the device, the more beneficial the effect of the identity verification completed with it. For example, a device's TID could indicate it is an old biometric scanner that is not as accurate as newer devices and therefore identity verifications conducted via the device could have less effect on a score than verifications conducted via a more current device. As another example, the TID could indicate the type of biometric data gathered. For instance, a TID could indicate that the device is an iris scanner, and therefore, if the system deems iris data more reliable than other biometric data, the associated identity verification could have greater impact than one conducted via another type of biometric scanner.

In an additional embodiment transactions within the system may be assigned a transaction number for reference in case of second communications between the local database and central database.

In one embodiment, the identity verification score system could provide instructions to presenters upon enrollment or subsequently. For example, upon enrollment, presenters could be supplied with a pamphlet listing verifiers and explaining which verifiers, or which transactions, have the greatest impact on their identity verification scores. In another illustration, if a presenter's identity verification score drops below a certain threshold, the system, a system manager, or a verifier could contact the presenter, such as via email, informing him of methods to increase his score to an acceptable level. For example, the system could suggest a presenter visit Kinko's to undergo biometric identity verification to increase his score. In one embodiment, verifiers could also be provided with instructions explaining how to increase their verifier scores.

In one embodiment, the type of biometric identity verification (e.g., local, central, or a combination thereof) used for a primary and/or secondary identity verification can affect an identity verification score. That is, the various types of biometric identity verifications can affect an identity verification score differently. For example, the present invention could also employ biometric data stored upon a token, such as a smartcard. A presenter could be authorized biometrically via a local match of a transaction biometric data with biometric data stored on the token. This biometric token authorization could affect the presenter's identity verification score less than a biometric identity verification based upon biometric data stored at a central database. In another scenario, a presenter could be verified by means of a BID distributed by a verifier or an identity verification system provider. The presenter could connect the BID to his computer (e.g., via a USB port) to verify himself and, optionally, to verify his local system, such as its registered identifier, ISP address, or the like. This type of authorization could have a greater impact on the identity verification score than other authorizations because the provided BID could meet a system requirement that a non-system BID could not. Alternatively, this type of authorization could have less effect on the identity verification score because the computer using the BID could be inferior to a computer used, for example, at a merchant location.

Having described a general system for creation and implementation of an identity verification score, an embodiment of an application that leverages the system is now provided. An identity verification score system could be beneficial when conducting transactions over various computerized networks, such as the Internet.

Participants in online transactions lack adequate methods of determining the legitimacy of the reciprocating party because online services do not sufficiently verify the identities of their users. Online services can be, for example, online retailers, online auctions, email service providers, chat services, online dating services, and the like. Because online services lack adequate identity verification mechanisms, they and their users are subject to fraud.

For example, some online services employ knowledge-based questionnaires to determine an individual's legitimacy, such as during enrollment or a transaction. Such knowledge-based systems require that a user answer "out-of-wallet" questions in an attempt to verify an individual's identity. These questions typically request information about the person's family (e.g., mother's maiden name), financial account information (e.g., amount of the last deposit), housing history (e.g., past three residences), and the like. While the answers to such questions are not readily available, a knowledgeable criminal could know, or learn, such information about the individual and, thus, deceive a knowledge-based system. For example, a husband and wife are likely to know a substantial amount of information about each other. That is, a husband is likely to know the maiden name of his wife, have access to her financial accounts (e.g., a shared account), and know her housing history, and vice versa. If this couple has martial problems, a vengeful spouse could perform fraudulent activities under the guise of the other individual, easily defeating the aforementioned security measures. Furthermore, knowledge-based systems attempt only to authenticate a person's identity, but do not reflect a sense of the individual's overall trustworthiness.

Other online services, typically pertaining to email, utilize digital signatures to authenticate their transactions. Digital signature systems can be defrauded as well, since they do not adequately attest to the authenticity of the person using the digital signature. For example, the digital signature could have been fraudulently obtained or stolen, allowing a criminal to impersonate someone else. A criminal could steal a person's laptop and send emails as if he were the laptop's owner by attaching the digital signature stored locally on the laptop. Some digital signature systems utilize biometric matching in an attempt to identify their users accurately. However, digital signatures, biometric or otherwise, focus solely on authentication and do not reflect an individual's trustworthiness.

Conversely, other online services attempt to provide a measure of their users' trustworthiness, but do so inadequately. For example, some online auction services, such as eBay, employ feedback scores in an attempt to provide their users with an idea of the reliability of other users. The feedback score reflects input from those with whom a user has conducted transactions, in such that positive feedback increases the score and negative feedback decreases it. Feedback scores are often affected by the number of transactions that a user has conducted via that particular online service. Therefore, such systems do not accurately represent a user who only conducts transactions occasionally. For example, a casual user might only conduct a few eBay transactions a year. Even if the user is legitimate, his feedback score might not reflect this due to his small quantity of transactions. Furthermore, even if the user's few transactions have earned him a high feedback score, other users reviewing his limited transaction history could decide that his feedback score is insubstantial. The present invention, however, can utilize information from a variety of transaction types to illustrate a person's trustworthiness. Thus, those viewing an individual's identity verification score can obtain an impression of his overall legitimacy, regardless of the amount of transactions he has conducted with a particular online service. For example, even if a user is participating in an online auction for the first time, his identity verification score can reflect information from previous primary and secondary identity verifications, such as transactions conducted at a POS in the physical world, and therefore the system already has a means of demonstrating his legitimacy.

As another example of a current feedback system, America Online Instant Messenger (AIM) has a warning level system in which users can increase each other's warning level to inform others that a user is problematic. However, both this and the aforementioned method rely on the participation of other service users who have little reason to participate and who could have ulterior motives. For example, eBay users are not required to provide feedback regarding those they conduct transactions with, and an apathetic individual could choose not to provide feedback (whether positive or negative). Participation in the AIM warning level system is also voluntary. For example, instead of increasing a problematic user's warning level, a user could decide to block the problematic user or could log out of the AIM program. Furthermore, feedback systems are inherently subjective; a satisfactory experience for one user could be considered unacceptable by another. Additionally, a legitimate user could receive a poor feedback score because another user provided negative feedback unjustly, perhaps out of spite or as a prank.

While these systems attempt to provide a measure of their users' trustworthiness, they do not sufficiently validate their users' authenticity. For example, an eBay feedback score pertains to the user's transaction history, but does not impart any information about the whether the user is actually who he claims to be. Such systems assume that individuals will provide accurate information, such as name, address, and the like, when enrolling, and thus do not protect against deceptive use of their systems. A fraudulent user could be banned from a particular online service, but typically this individual can reregister with the system by providing different information and selecting a different user name. Moreover, a fraudulent user could have multiple accounts unbeknownst to the service provider. Various email providers, such as Hotmail and Yahoo, are susceptible to such multiple enrollment problems as well. Online services can attempt to prevent repeated abuse through such methods as Internet Protocol (IP) logging. However, a knowledgeable criminal can circumvent this, in some cases by simply using a different computer or Internet connection.

As aforementioned, conventional online services lack a means for determining an individual's overall legitimacy. For example, because online services occur in a virtual environment, their user scoring systems do not reflect an individual's physical world behavior. There is no face-to-face verification of a person's identity. Although some online services, such as digital signature providers, incorporate physical verification methods in their enrollment process, they do not ensure an authentic face-to-face verification of the individual. An individual could be required to provide physical documents and tokens (or copies thereof) when registering, but such documents can be forged or fraudulently obtained, thereby allowing an unscrupulous person to misrepresent himself. Even if the service provider requires notarized documents, the notarization itself can be fraudulent.

The present invention could be implemented to provide online services and their users with an indication of the authenticity and trustworthiness of parties participating in online transactions by providing an identity verification score reflective of an individual's identity verifications, including those conducted in the physical world. The present invention provides a means for verifiers to assess a score demonstrative not only of an individual's authenticity, but also of the person's physical world and/or online transaction history, thereby providing a sense of his overall credibility. Furthermore, the identity verification system can provide online services with a means to monitor the behavior of users and to prevent repeat offenses by the same individuals.

Figure 5:
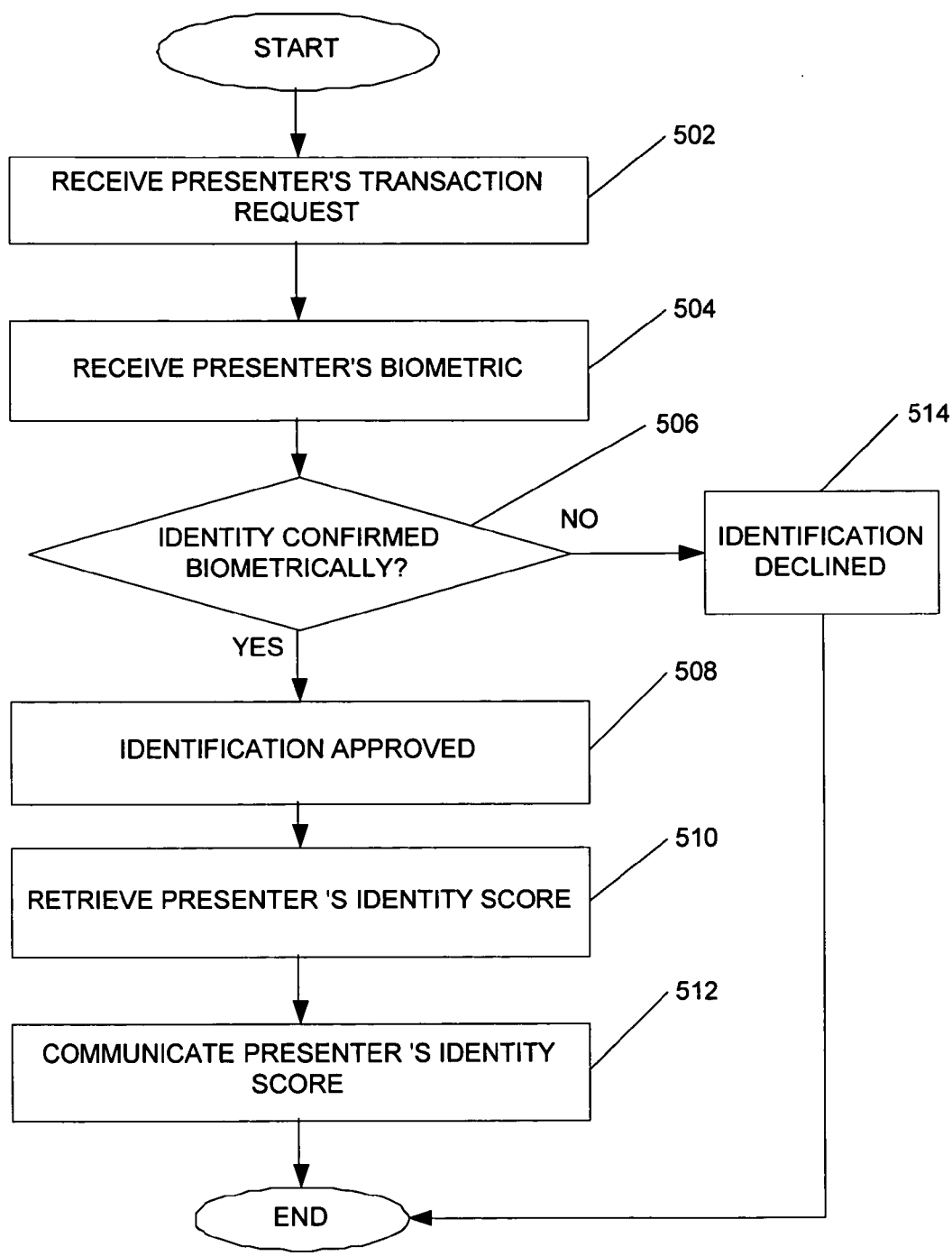
FIG. 5 illustrates a flowchart of a process for presenter identity verification during an online transaction.

FIG. 5 illustrates a flowchart of a process for presenter identity verification during an online transaction. An online transaction can be any exchange conducted via a computerized network, such as a LAN, WAN, or the Internet. For example, an online transaction could be an online purchase, an email, an instant message, or the like.

Depending upon the embodiment, the identity verification system could function separately from transaction processing or in direct conjunction with it. At step 502, the system receives the presenter's request to conduct a transaction. For example, while viewing an online retail site, such as Amazon.com, or an online auction site, such as eBay, the presenter could select a product or service that he wishes to purchase or bid upon. In another illustration, a presenter wishing to communicate an email or instant message could indicate the desired recipient(s) and could initiate the communication, such as by sending the email or instant message.

At step 504, the system receives the presenter's biometric. In one embodiment, the system also receives the presenter's SID. For example, the presenter could enter his SID via a computer and provide his biometric data via an attached BID. Although FIG. 5 illustrates the system receiving a transaction request prior to receiving the presenter's biometric data, this should not be construed as limiting. For example, a presenter could provide biometric data and/or his SID before initiating a transaction, such as when logging onto a computer, into a particular application, or into a website. In another scenario, the system could receive the presenter's biometric data and/or the SID and the transaction request simultaneously. In one scenario, once a presenter has logged on and been identified, his identity score can be ported from one application or web-site to the next. This porting can be done automatically or could be accomplished per the presenter's request.

In one embodiment, an identity verification score can function in conjunction with a digital certificate. This identity verification score could be associated with a digital certificate to illustrate that it was issued through the use of biometric identity verification and, in one scenario, was issued through a physical world enrollment with a verifier present. A presenter could undergo identity verification at a verifier location and then receive a digital certificate associated with his identity verification score. The presenter's digital certificate could be provided to the presenter on a physical medium (e.g., a CD-ROM) or could be retrieved when the presenter accesses the identity verification score system online.

At step 506, the system determines if the presenter's identity is confirmed biometrically. A presenter's identity can be biometrically confirmed via any of the aforementioned methods. For example, the system can transmit the transaction biometric data and SID to the central or verifier database and the transaction biometric data can be compared at the database with biometric data stored in association with the SID. In another example, the system could transmit the SID to the central or verifier database, locate biometric data stored in association with the SID, transmit the stored biometric data to the POV, and compare the transaction biometric data with the stored biometric data at the POV.

If at step 506 the presenter's identity is not confirmed, presenter identification is declined at step 514 and the online transaction does not proceed. If the presenter's identity is confirmed at step 506, the presenter's identification is approved at step 508.

At step 510, the system retrieves the presenter's identity verification score stored in the system record associated with the matching biometric data. The presenter's identity verification score can be generated via a variety of procedures. As aforementioned, the identity verification score could be already generated when the system retrieves it or could be generated during retrieval and could incorporate information from the current transaction.

As mentioned, an identity verification score could be based upon a particular type or types of identity verifications. In one embodiment, an identity verification score could be based solely on physical world transactions. A physical world-defined score could be used for online transactions, physical world transactions, or both. Examples of physical world transactions include point of sale transactions, physical correspondence, physical access transactions, age-verifications, or the like. Examples of online transactions include financial transactions, file-sharing transactions, email, instant messaging, online chat, virtual access transactions, age-verifications, faxes, or the like. For example, an identity verification score based solely on physical world transactions could be used for online transactions, but online transactions could have no effect on the score. Such a scenario could be implemented if it is deemed that online transactions are not sufficiently dependable to warrant having an impact on an identity verification score due to the lack of face-to-face interaction. Unlike conventional user scoring systems, this embodiment could provide online services with an indication of face-to-face transactions conducted by their service users. Therefore, users of the services can be ensured that the presenter has undergone biometric identity verification in a physical world setting. In other embodiments, the identity verification score could be reflective of both online transactions and physical world transactions, or only of online transactions.

At step 512, the presenter's identity verification score is communicated to one or more verifiers with which the presenter wishes to engage in an online transaction. As aforementioned, a verifier could be an individual or an automated entity. The method of identity verification score communication can vary per the online transaction. In one scenario, the verifier could receive a message on his own transaction device, such as a computer, informing him that the presenter wishes to engage in an online transaction. For example, a popup message could appear on the verifier's screen prompting him to respond to the presenter's request. This prompt could include a variety of information in addition to the presenter's identity verification score, such as an explanatory message, the presenter's name or another identifier, and the like. For example, "Angelina Jolie has sent you an email. Identity Verification Score: 83% Do you accept?" The verifier could then make a determination whether to accept or decline the transaction. As aforementioned, a presenter's identity verification score can be presented in a variety of formats, including a visual representation, such as a percentage, a number, an icon, text, a light, and/or an audio representation, such as a tone or audio message, or the like.

In one embodiment, the presenter's identity verification score could be presented at a website. The website could be maintained by a third party, such as an identity verification score provider, or the like. For example, the website could be independent from other online services and the sole function of the website could be to provide a sense of a presenter's authenticity and trustworthiness. An individual could retrieve a presenter's identity verification score by entering presenter identifying information at the website. In one scenario, the system could communicate an identification number that the verifier could submit to the website to retrieve the presenter's score. Alternatively, the presenter could be located by name, address, phone number, SID, or the like. Use of the website need not be associated with a particular transaction. For example, an individual placing a classified ad could note that his identity verification score is available at an identity verification website to allow potential buyers to view it. As another illustration, an online dating service user could provide an identity verification website identifier via his profile to allow other users to view his identity score at the identity verification score website.

Once the verifier has reviewed the presenter's identity verification score, he can make a determination whether to participate in the online transaction with the presenter. If the verifier is an online merchant, such as Amazon.com, the determination could be accomplished automatically. Amazon.com, or its financial processor, could receive the presenter's identity verification score, or an appropriate representation of the score, and automatically decide to accept or decline the transaction accordingly. For such automatic processes, representations of the identity verification score are not likely to be needed, but the identity verification score could still be presented in a representative format. For example, an icon is not likely to be of use to Amazon.com, but the associated identity verification score level could. That is, while the system could display an actual icon to individuals, it could simply provide data that reflects the icon to automated systems. This scenario allows the identity verification system to keep the actual identity verification score private, but still impart accurate data reflective of the presenter's system use. Alternatively, the identity verification system could impart the actual identity verification score to automated entities and reserve identity verification score representations for individuals.

If the verifier is an individual, once he has made his decision, his method of response could be determined by the method in which the identity verification score was communicated to him. For example, if an individual received a popup message indicating that the presenter wishes to engage him, the popup message could include "Yes" and "No" buttons and the individual could select the appropriate one. If the online transaction is an online auction transaction, the identity verification score could be shown to the verifier when he accesses the auction website. This could be prior to the completion of the auction, such as when the presenter places a bid, thereby allowing the verifier to determine whether the presenter can participate in the auction. Alternatively, the system could present the identity verification score once the auction has been completed, but prior to the verifier acknowledging the presenter as the winner of the auction. Thus, the verifier could cancel the auction transaction if he determines that the presenter's identity score does not reflect a legitimate buyer. In an email scenario, the verifier could receive an anticipatory notice informing him that the presenter wishes to send him an email. In one embodiment, the anticipatory notice could include information regarding the content of the email. The verifier could indicate his willingness to accept the email by, for example, sending a reply or clicking a hyperlink incorporated in the anticipatory notice.

As mentioned, in one embodiment, the system can work in direct conjunction with an online service as part of transaction processing. Once the verifier's determination regarding the presenter has been received, the system can govern the transaction accordingly. Thus, if the verifier has decided to participate in the online transaction, the transaction is conducted. For example, if the verifier has opted to receive a presenter's instant message, an instant messaging session can be initiated. If the transaction is an online purchase, the purchase could be processed. Alternatively, if the verifier decided not to participate in the transaction, the transaction would be cancelled. For example, the presenter's email message would not be communicated. In one embodiment, the online transaction could be governed by parameters. For instance, an online service could allow presenters with excellent identity verification scores to purchase high-value items, while those with mediocre scores can purchase mid-range items, and those with lower scores cannot make any purchases.

In one embodiment, for online and/or physical world transactions, a presenter's identity verification score could indicate that the presenter could be acceptable if he completed one or more supplemental verification steps. For example, a presenter could have a mid-range identity verification score because his legitimacy is indeterminate. Therefore, the system, or the verifier, could determine that the presenter could be acceptable if he completed one or more actions to improve his identity verification score. For example, before he can complete a transaction, the presenter could be asked to call a particular number to provide more information or could be required to undergo a physical world identity verification at a particular location. As another example, the presenter could be required to have a person listed in his system record contact the system or the verifier to vouch for him. As yet another example, the presenter could be asked to use the form of payment (e.g., a certain credit card account) that the system has determined to be reliable in order to conduct the transaction.

For many types of online transactions, such as instant messaging, online auctions, email, online dating, and the like, each participant will be an individual, and therefore, in terms of the invention, each participant is both a presenter and a verifier. The identity verification scores of all participating parties could be communicated to all those involved in the transaction. Furthermore, all of the parties involved could make their own determination regarding transaction participation. Therefore, one party could opt to participate while another could decline (and therefore the transaction would be declined). For example, during online auctions, both buyers and sellers could review each others' identity verification scores. Alternatively, an identity verification score could be shown to only one party or a select group of participating parties. For example, if an individual wishes to conduct a financial transaction with a second party, the second party could view the individual's identity verification score while the individual could not view the second party's score.

In one embodiment, the identity verification score system could function even in an anonymous system. For example, a presenter could be known to verifiers by an identifier that is not directly related to him. For example, verifiers could only view a presenter's online identifier, such as a user name or identification number, while actual identifying information, such as the presenter's name, address, telephone number, and the like, could be kept private. The presenter's identity verification score would be visible, thereby providing verifiers with a sense of the presenter's legitimacy regardless of his anonymity. The present invention also provides further security for anonymous systems by restricting re-enrollment. Although a presenter's actual identity could be kept private, the use of biometric data prevents re-enrollment because a presenter's system record is associated with his biometric data. In one scenario, a presenter could have a separate identity verification score for anonymous and non-anonymous transactions. Depending upon the embodiment, identity verifications associated with anonymous system use could or could not affect the presenter's non-anonymous score and vice versa. For example, the presence of an anonymous identity score could have a negative impact on presenter's non-anonymous identity score because a verifier could determine that an anonymous identity score indicates that the presenter has conducted transactions he wishes to keep secret, and therefore, has something to hide.

In addition to purchase and communication transactions, the identity verification system could be used in conjunction with online dating services in order to provide users with an indication of the legitimacy of other users. For example, when reviewing the dating profiles of other dating service users, an individual could also view their identity verification scores. A poor identity verification score could indicate the associated user is not who he claims to be or, if the system has access to third party data, could reflect someone with a criminal history.

As aforementioned, third party testaments can be employed by the system when determining identity verification scores. A specific type of testament could be feedback from other users of online services. For example, the identity verification system could utilize data from an existing system, such as the eBay feedback system, in combination with the other data when determining an identity verification score. Various methods could be used to obtain feedback, such as via surveys, instant feedback (such as the warning level feature from AIM), correspondence with a system manager, correspondence from a verifier, or the like. As discussed above, the identity verification score of those serving as a reference, in this scenario via feedback, could be considered when determining its impact. For example, a presenter with a high identity verification score providing feedback could have greater impact on a person's identity verification score than feedback from a questionable presenter. Conversely, a presenter with a high identity verification score providing negative feedback could greatly lower a person's identity verification score, whereas negative feedback from a questionable presenter could have little or no effect. Also as described above in regard to score references, during subsequent use, a presenter's identity verification score could change to reflect changes in the identity verification scores of those who have provided feedback.

An identity verification system using biometric identification and a scoring system has been illustrated. It will be appreciated by those skilled in the art that the system and method of the present invention can be used to perform more secure and reliable identity verifications, and in addition, allows presenters to verify their age and pay for merchandise with the same biometric used to verify their identity. Additionally, it will be appreciated that the system and method of the present invention can be used in conjunction with online transactions, such as purchases, auctions, email, instant messaging, and like. It is anticipated that the present invention will especially find utility in preventing identity and verifier fraud. It will thus be appreciated by those skilled in the art that other variations of the present invention will be possible without departing from the scope of the invention as disclosed.

The invention claimed is:

1. A method for conducting an online transaction with the assistance of an identity verification score, the method comprising:
   receiving, via a remote biometric input device operably connected to a network enabling access to a virtual environment, a first sample of biometric data proffered by a presenter seeking to conduct a transaction via the virtual environment;
   comparing, via a computing device, said first sample of said biometric data with a second sample of biometric data stored in a system record;
   determining, via said computing device, whether said first sample of said biometric data matches said second sample of said biometric data;
   in response to said received first sample of said biometric data matching said second sample of said biometric data, determining an identity verification score associated with said system record, the identity verification score at least including a third party testament variable via a third party mobile device;
   playing, by said computing device, a tone of said third party mobile device;
   receiving, by said computing device, the tone from a device of said presenter;
   determining, by said computing device, a physical proximity between said presenter device and said third party mobile device, using the received tone;
   determining, by said computing device, an identity verification score using the determined physical proximity; and
   authorizing, by said computing device, the transaction using the identity verification score.

2. The method of claim 1, wherein said identity verification score is further reflective of online transactions conducted by said presenter.

3. The method of claim 1, comprising automatic evaluation of said identity verification score, wherein said automatic evaluation of said identity verification score is configured by one or more of a second party and a third party.

4. The method of claim 1, comprising governing said transaction in the virtual environment based upon said identity verification score, wherein said governing comprises requesting said presenter to perform one or more identity verification actions.

* * * * *